(12) United States Patent
Bae et al.

(10) Patent No.: US 12,530,921 B2
(45) Date of Patent: Jan. 20, 2026

(54) DISPLAY DEVICE

(71) Applicant: Samsung Display Co., LTD., Yongin-si (KR)

(72) Inventors: Kwang Soo Bae, Yongin-si (KR); Gun Hee Kim, Yongin-si (KR); Dae Young Lee, Yongin-si (KR); Min Oh Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 341 days.

(21) Appl. No.: 18/104,580

(22) Filed: Feb. 1, 2023

(65) Prior Publication Data

US 2023/0298378 A1 Sep. 21, 2023

(30) Foreign Application Priority Data

Mar. 16, 2022 (KR) .................. 10-2022-0032966

(51) Int. Cl.
| | | |
|---|---|---|
| G06V 40/13 | (2022.01) | |
| G06F 3/041 | (2006.01) | |
| G06F 3/044 | (2006.01) | |
| G09G 3/3233 | (2016.01) | |
| H10K 39/34 | (2023.01) | |
| H10K 59/12 | (2023.01) | |
| H10K 59/35 | (2023.01) | |
| H10K 59/40 | (2023.01) | |

(52) U.S. Cl.
CPC ........ *G06V 40/1318* (2022.01); *G06F 3/0412* (2013.01); *H10K 39/34* (2023.02); *H10K 59/40* (2023.02); *G06F 3/0445* (2019.05); *G09G 3/3233* (2013.01); *G09G 2300/0819* (2013.01); *G09G 2300/0842* (2013.01); *G09G 2300/0861* (2013.01); *G09G 2354/00* (2013.01); *G09G 2360/14* (2013.01); *H10K 59/12* (2023.02); *H10K 59/35* (2023.02)

(58) Field of Classification Search
CPC .... G06V 40/1318; H10K 39/34; H10K 59/40; H10K 59/35; H10K 59/12; G06F 3/0412; G06F 3/0445; G09G 3/3233; G09G 2300/0819; G09G 2300/0842; G09G 2300/0861; G09G 2354/00; G09G 2360/14

See application file for complete search history.

(56) References Cited

U.S. PATENT DOCUMENTS

| | | |
|---|---|---|
| 11,543,904 B2 | 1/2023 | Bok et al. |
| 11,543,919 B2 | 1/2023 | Han et al. |

(Continued)

FOREIGN PATENT DOCUMENTS

| | | |
|---|---|---|
| KR | 10-2021-0069776 A | 6/2021 |
| KR | 10-2021-0086907 A | 7/2021 |
| KR | 10-2022-0030004 A | 3/2022 |

*Primary Examiner* — Timor Karimy
(74) *Attorney, Agent, or Firm* — Womble Bond Dickinson (US) LLP

(57) ABSTRACT

A display device includes: a sub-pixel on a substrate and including a light emitting element; a photo-sensing pixel on the substrate and including a light-receiving element including a light-receiving layer configured to obtain a sensing signal corresponding to light emitted from the light emitting element; a touch sensor configured to obtain information about a touch input and including a conductive layer, wherein the conductive layer includes a hole area overlapping the light-receiving layer in a plan view.

18 Claims, 11 Drawing Sheets

(56) References Cited

U.S. PATENT DOCUMENTS

| | | |
|---|---|---|
| 11,744,135 B2 | 8/2023 | Lim et al. |
| 2021/0064159 A1 | 3/2021 | Yeke Yazdandoost et al. |
| 2022/0067340 A1* | 3/2022 | Han ........................ G06F 3/042 |

* cited by examiner

DISPLAY DEVICE

CROSS-REFERENCE TO RELATED APPLICATION

The present application claims priority to and the benefit of Korean Patent Application No. 10-2022-0032966, filed Mar. 16, 2022, the entirety of which is hereby incorporated herein by reference.

BACKGROUND

1. Field

Aspects of some embodiments of the disclosure relate to a display device.

2. Discussion

As the information society develops, the demand for display devices for displaying images is increasing in various forms. For example, display devices may be applied to various electronic devices such as smart phones, digital cameras, notebook computers, navigation devices, and smart televisions.

Recently, research and development on a technology for integrating a fingerprint sensor for recognizing a fingerprint or the like in a display panel that occupies a relatively large area in the display device is being conducted.

The above information disclosed in this Background section is only for enhancement of understanding of the background and therefore the information discussed in this Background section does not necessarily constitute prior art.

SUMMARY

Aspects of the disclosure include a display device capable of clearly sensing an external input by improving sensing performance of a photo-sensing pixel.

Aspects of the disclosure are not limited to the above-described object, and other objects not mentioned will be clearly understood by those skilled in the art from the following description.

According to some embodiments of the present disclosure, a display device may include a sub-pixel on a substrate and including a light emitting element; a photo-sensing pixel on the substrate and including a light-receiving element including a light-receiving layer configured to obtain a sensing signal corresponding to light emitted from the light emitting element; a touch sensor configured to obtain information about a touch input and including a conductive layer, and the conductive layer may form a hole area overlapping the light-receiving layer in a plan view.

According to some embodiments, the sub-pixel may include an emission area from which the light is emitted from the light emitting element, and the photo-sensing pixel may include a light-receiving area receiving the light.

According to some embodiments, a portion of the conductive layer may surround the emission area, and another portion of the conductive layer may surround the light-receiving area.

According to some embodiments, the conductive layer may surround a portion of the light-receiving area in the hole area in a plan view.

According to some embodiments, the conductive layer may include a protrusion adjacent to the hole area to define the hole area.

According to some embodiments, the conductive layer may include a first conductive layer and a second conductive layer, and the protrusion may extend from a portion of the second conductive layer, and overlap the light-receiving layer without overlapping the first conductive layer in a plan view.

According to some embodiments, the second conductive layer may be more spaced apart from the substrate than the first conductive layer.

According to some embodiments, the conductive layer may include a first area and a second area, the first area of the conductive layer may be adjacent to the hole area and surround at least a portion of the hole area, and the second area of the conductive layer may be spaced apart from the hole area.

According to some embodiments, the first area of the conductive layer may have a first width and the second area of the conductive layer may have a second width, and the first width may be greater than the second width.

According to some embodiments, the conductive layer may further include a third area, the third area of the conductive layer may be an area connecting adjacent second areas, and the third area may have a polygonal shape forming an opening area.

According to some embodiments, the conductive layer may further include a third area, the third area of the conductive layer may be an area connecting adjacent second areas, and the third area may have a shape in which the adjacent second areas intersect each other without forming an opening area.

According to some embodiments, the hole area may have a rectangular shape in a plan view.

According to some embodiments, a diameter of the hole area may be 7.5 μm or less.

According to some embodiments, the conductive layer may be spaced apart from the emission area by a separation distance, and the diameter of the hole area may be smaller than the separation distance.

According to some embodiments, the separation distance may be 8.0 μm or more and 15 μm or less.

According to some embodiments, the conductive layer may be patterned by a wet etching process.

According to some embodiments, the sub-pixel may include a first sub-pixel emitting light of a first color, a second sub-pixel emitting light of a second color, and a third sub-pixel emitting light of a third color, and the light-receiving area may be adjacent to an emission area of the first sub-pixel and an emission area of the third sub-pixel in a first direction, and may be adjacent to an emission area of the second sub-pixel in a second direction different from the first direction.

According to some embodiments, the light-receiving element may include one selected from a group consisting of a photo diode, a CMOS image sensor, a CCD camera, and a photo transistor.

According to some embodiments, the conductive layer may form a driving electrode and a receiving electrode of the touch sensor.

According to some embodiments of the present disclosure, a display device may include a light emitting element on a substrate; a light-receiving layer on the substrate; and a conductive layer on the substrate and forming a touch electrode. The conductive layer may define a hole area overlapping the light-receiving layer, and the conductive layer may be patterned by a wet etching process.

BRIEF DESCRIPTION OF THE DRAWINGS

The accompanying drawings, which are included to provide a further understanding of the inventive concepts, and are incorporated in and constitute a part of this specification, illustrate embodiments of the inventive concepts, and, together with the description, serve to explain principles of the inventive concepts.

DETAILED DESCRIPTION

Figure 1:
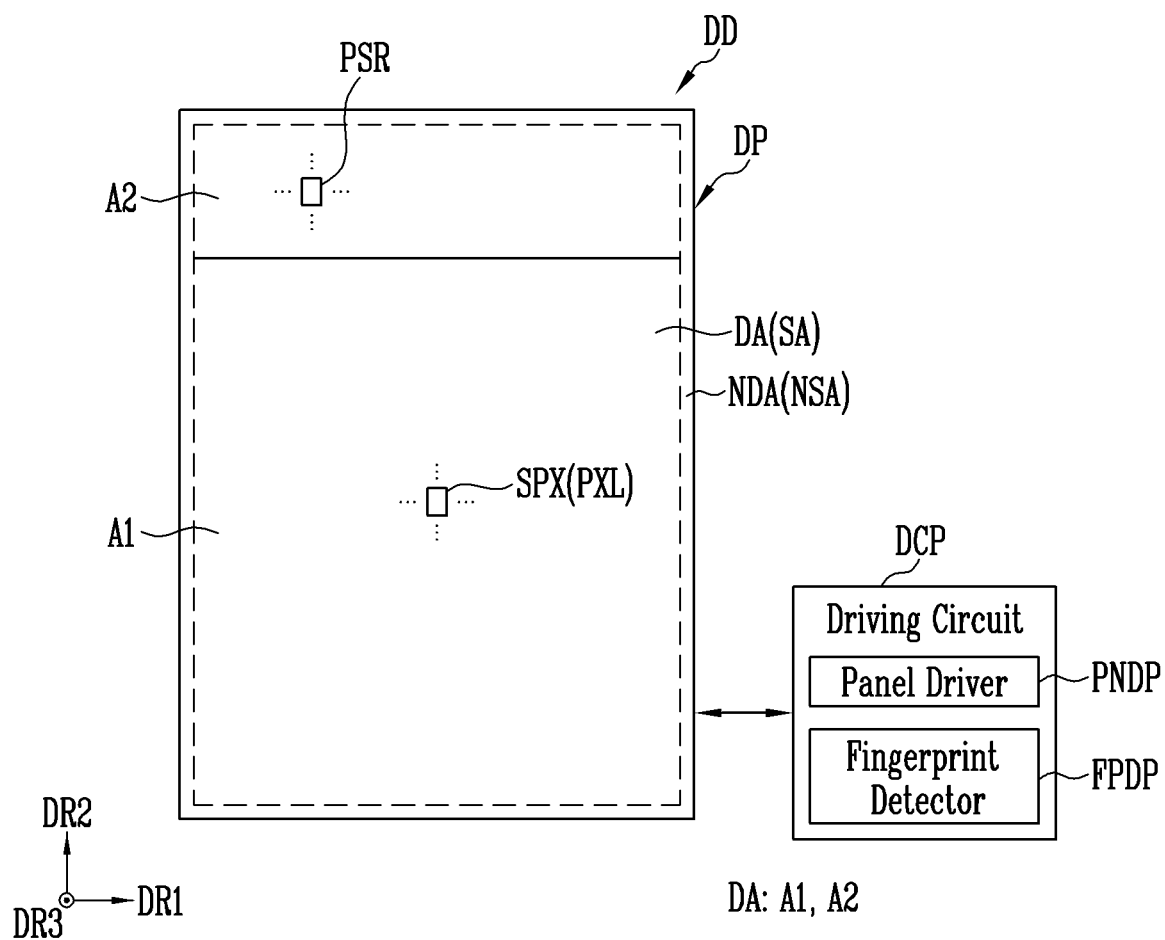
FIGS. 1 and 2 are plan views schematically illustrating display devices according to some embodiments.

As the disclosure allows for various changes and numerous embodiments, particular embodiments will be illustrated in the drawings and described in detail in the written description. However, this is not intended to limit the disclosure to particular modes of practice, and it is to be appreciated that all changes, equivalents, and substitutes that do not depart from the features and technical scope of the disclosure are encompassed in the disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the scope of the disclosure. Similarly, the second element could also be termed the first element. In the disclosure, the singular expressions are intended to include the plural expressions as well, unless the context clearly indicates otherwise.

It will be further understood that the terms "comprise", "include", "have", etc. used in the disclosure, specify the presence of stated features, integers, steps, operations, elements, components, and/or combinations of them but do not preclude the presence or addition of one or more other features, integers, steps, operations, elements, components, and/or combinations thereof. In addition, when a first part such as a layer, film, region, plat, etc. is on a second part, the first part may be not only "directly on" the second part but a third part may intervene between them.

Furthermore, in the disclosure, when a first part such as a layer, film, region, plat, etc. is formed on a second part, a direction in which the first part is formed is not limited to an upper direction of the second part, but may include a side or a lower direction of the second part. To the contrary, when a first part such as a layer, film, region, plat, etc. is "under" a second part, the first part may be not only "directly under" the second part but a third part may intervene between them.

The disclosure relates to a display device. Hereinafter, a display device according to some embodiments will be described with reference to the accompanying drawings.

Figure 2:
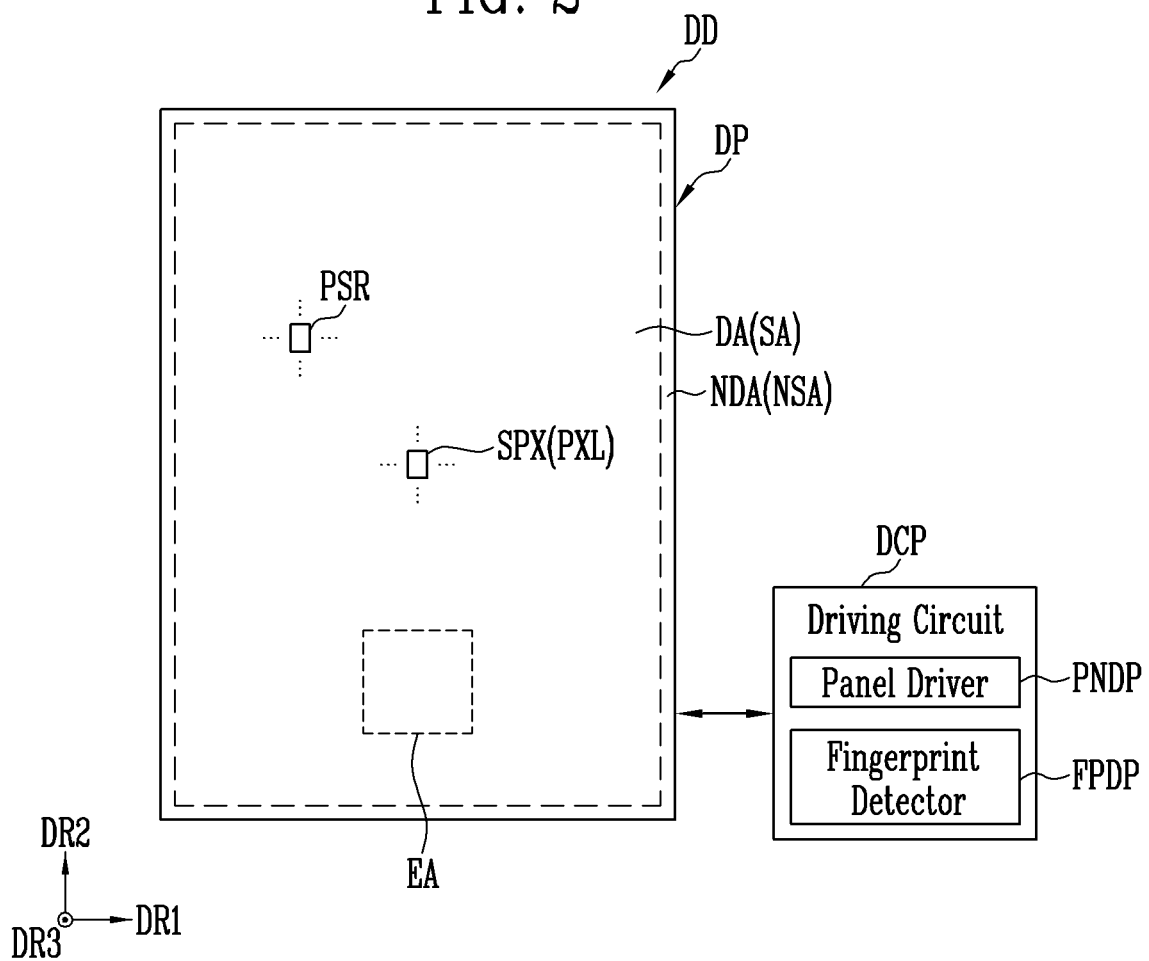

FIGS. 1 and 2 are plan views schematically illustrating display devices according to some embodiments. For example, FIGS. 1 and 2 may be plan views schematically illustrating display panels DP included in a display device DD according to some embodiments, and driving circuits DCP for driving the display panels DP.

For convenience of description, in FIGS. 1 and 2, a display panel DP and a driving circuit DCP are shown to be separated. However, embodiments according to the present disclosure are not limited thereto. According to some embodiments, all or part of the driving circuit DCP may be implemented integrally with the display panel DP.

Referring to FIGS. 1 and 2, the display device DD may include the display panel DP and the driving circuit DCP.

The display device DD may be configured to provide light. The display device DD may have various shapes. For example, the display device DD may be provided in a rectangular plate shape having two pairs of sides parallel to each other. According to some embodiments, an extension direction of the long side is indicated as a second direction DR2 and an extension direction of the short side is indicated as a first direction DR1. According to some embodiments, the display device DD provided in the rectangular plate shape may have a round shape at a corner where one long side and one short side contact each other. However, embodiments according to the present disclosure are not limited thereto.

According to some embodiments, at least a portion of the display device DD may have flexibility, and may be folded at the flexible portion.

The display device DD may be applied to various devices. For example, the display device DD may be a flexible display device, a curved display device, a foldable display device, or a bendable display device. Also, the display device DD may be applied to a transparent display device, a head-mounted display device, a wearable display device, and the like. However, embodiments according to the present disclosure are not limited thereto.

The display panel DP may include a display area DA and a non-display area NDA. In the display area DA, sub-pixels SPX (or pixels PXL) may be provided to display an image. The non-display area NDA may be located on at least one side of the display area DA. For example, the non-display area NDA may have a shape surrounding the display area DA. That is the non-display area NDA may be located in a periphery of the display area DA.

A plurality of sub-pixels SPX may be provided in the display area DA. According to some embodiments, each of the sub-pixels SPX may include at least one light emitting element LD (refer to FIG. 5). According to some embodiments, the light emitting element LD may be an organic light emitting diode or a light emitting unit including ultra-small inorganic light emitting diodes having a size in a micro to nano scale range. However, embodiments according to the present disclosure are not limited thereto. The display device DD may display an image in the display area DA by driving the sub-pixels SPX in response to input image data.

The non-display area NDA may be an area surrounding at least one side of the display area DA, and may include the remaining area except for the display area DA. According to some embodiments, the non-display area NDA may include a wiring area, a pad area, and/or various dummy areas.

According to some embodiments, one area of the display area DA may be set as a sensing area SA configured to detect a user's fingerprint or the like. That is, at least a portion of the display area DA may be the sensing area SA. The sensing area SA may include at least some of the sub-pixels SPX provided in the display area DA.

According to some embodiments, only a part of the display area DA may be set as the sensing area SA. Also, according to some embodiments, the entire display area DA may be set as the sensing area SA. When the entire display area DA is set as the sensing area SA, the non-display area NDA surrounding the display area DA may be a non-sensing area NSA. A plurality of photo-sensing pixels PSR (or photo sensors) may be located in the sensing area SA together with the plurality of sub-pixels SPX. That is, according to some embodiments, the photo-sensing pixels PSR may be located over the entire display area DA, so that the user's fingerprint can be detected in an area where an image is viewed.

Figure 5:
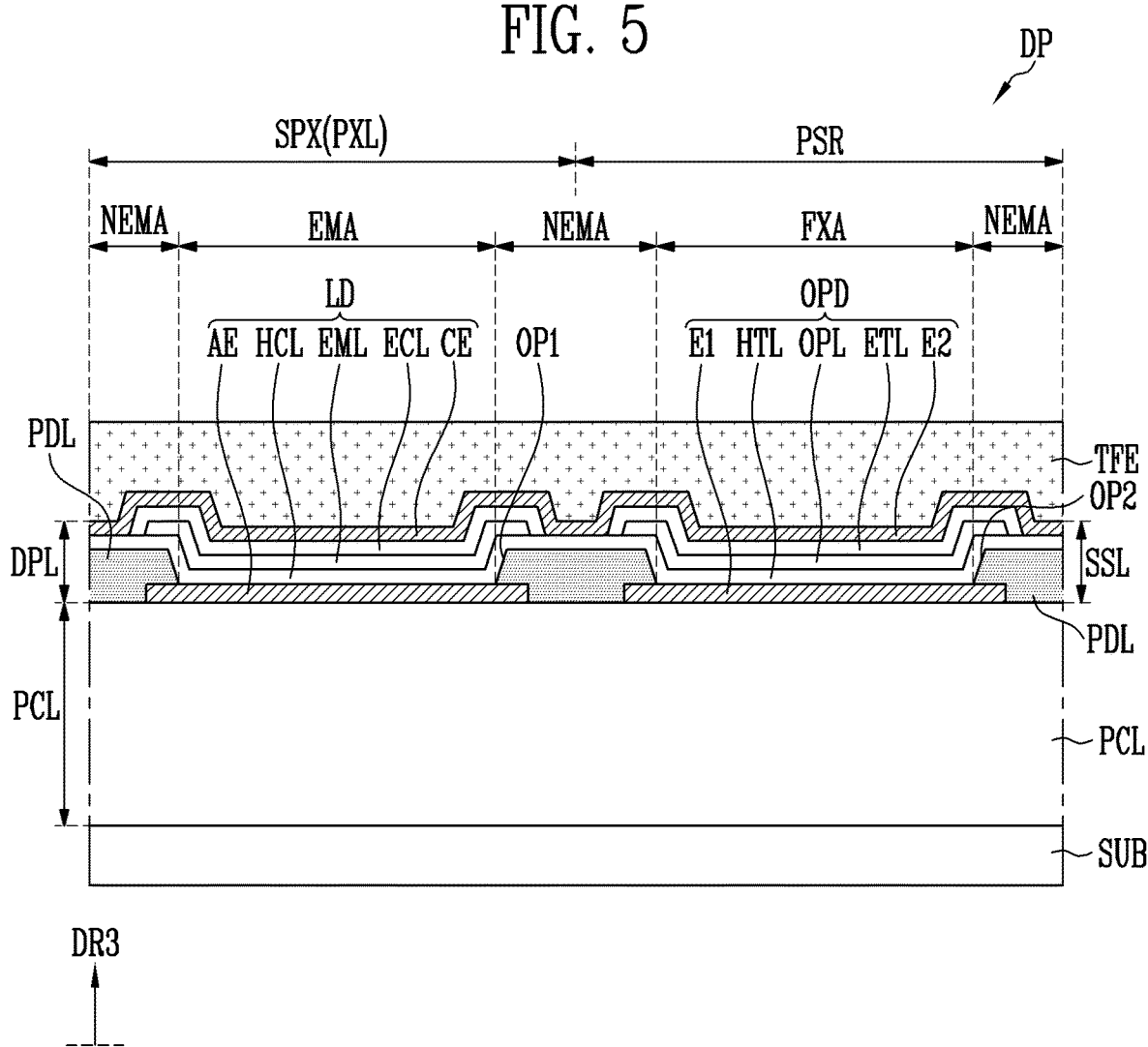
FIG. 5 is a cross-sectional view schematically illustrating a display panel according to some embodiments.

Each of the photo-sensing pixels PSR may include a light-receiving element OPD (refer to FIG. 5) including a light-receiving layer OPL (refer to FIG. 5). The light-receiving layer OPL of the light-receiving element OPD may be spaced apart from an emission layer EML (refer to FIG. 5) of the light emitting element LD in the display area DA.

According to some embodiments, the plurality of photo-sensing pixels PSR may be distributed over the entire display area DA to be spaced apart from each other. However, embodiments according to the present disclosure are not limited thereto. As shown in FIG. 1, when the display area DA is divided into a first area A1 and a second area A2 in the second direction DR2, the photo-sensing pixels PSR may be located only in the second area A2. According to some embodiments, the photo-sensing pixels PSR may also be located in at least a portion of the non-display area NDA.

According to some embodiments, the photo-sensing pixels PSR may sense light emitted from a light source (for example, the light emitting element LD) and reflected by an external object (for example, a user's finger or the like). For example, the user's fingerprint may be sensed through each of the photo-sensing pixels PSR. Hereinafter, embodiments in which the photo-sensing pixels PSR are used for sensing a fingerprint will be described as an example. However, in some embodiments, the photo-sensing pixels PSR may sense various biometric information such as an iris and a vein. In addition, the photo-sensing pixels PSR may sense external light and may perform a function such as a gesture sensor, a motion sensor, a proximity sensor, an illuminance sensor, or an image sensor.

The driving circuit DCP may drive the display panel DP. For example, the driving circuit DCP may output a data signal corresponding to image data to the display panel DP. Also, the driving circuit DCP may output a driving signal for the photo-sensing pixels PSR and receive an electrical signal (for example, a sensing signal) received from the photo-sensing pixels PSR. The driving circuit DCP may detect a shape of the user's fingerprint using electrical signals.

According to some embodiments, the driving circuit DCP may include a panel driver PNDP and a fingerprint detector FPDP (or a sensor driver). For convenience of description, in FIGS. 1 and 2, the panel driver PNDP and the fingerprint detector FPDP are shown to be separated, but embodiments according to the present disclosure are not limited thereto. For example, at least a part of the fingerprint detector FPDP may be integrated together with the panel driver PNDP or may operate in conjunction with the panel driver PNDP.

The panel driver PNDP may supply a data signal corresponding to an image data signal to the sub-pixels SPX while sequentially scanning the sub-pixels SPX of the display area DA. In this case, the display panel DP may display an image corresponding to the image data.

According to some embodiments, the panel driver PNDP may supply a driving signal for detecting a fingerprint to the sub-pixels SPX. The driving signal may be provided so that the sub-pixels SPX emit light and operate as a light source so that the photo-sensing pixels PSR can sense a fingerprint. According to some embodiments, the panel driver PNDP may supply the driving signal for sensing a fingerprint and/or other driving signals to the photo-sensing pixels PSR. However, embodiments according to the present disclosure are not limited thereto, and driving signals for sensing a fingerprint may be provided by the fingerprint detector FPDP.

The fingerprint detector FPDP may detect biometric information, such as the user's fingerprint, based on the sensing signal received from the photo-sensing pixels PSR. According to some embodiments, the fingerprint detector FPDP may supply the driving signals to the photo-sensing pixels PSR and/or the sub-pixels SPX.

Figure 3:
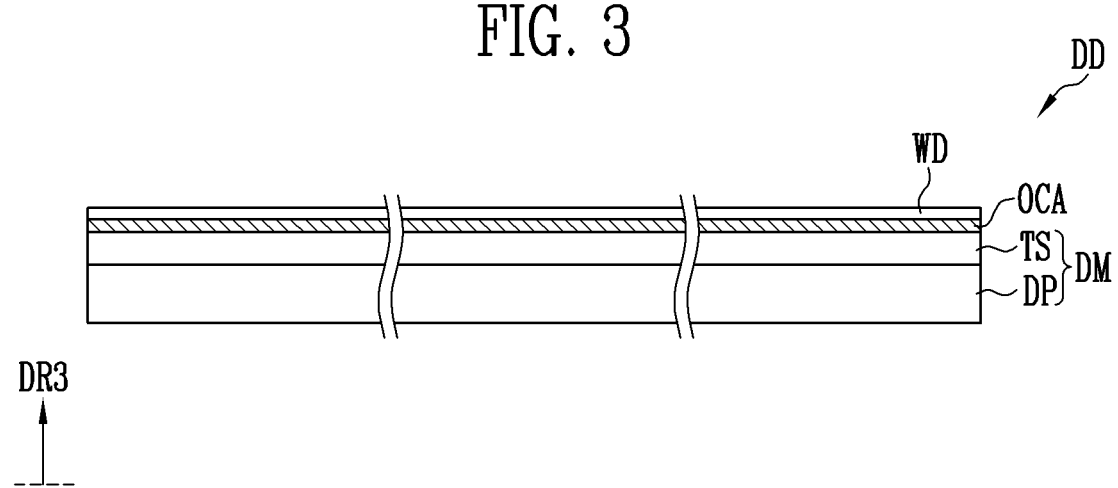
FIG. 3 is a cross-sectional view schematically illustrating a display device according to some embodiments.

FIG. 3 is a cross-sectional view schematically illustrating a display device according to some embodiments.

In FIG. 3, for convenience of description, a thickness direction of the display device DD is indicated as a third direction DR3. Referring to FIG. 3, the display device DD may include a display module DM and a window WD.

The display module DM may include the display panel DP and a touch sensor TS.

The touch sensor TS may be located directly on the display panel DP or may be located on the display panel DP with a separate layer such as an adhesive layer or a substrate (or insulating layer) interposed therebetween.

The display panel DP may display an image. A display panel configured to emit light by itself such as an organic light emitting display panel (OLED panel) may be used as the display panel DP. In addition, a non-light emitting display panel such as a liquid crystal display panel (LCD panel), an electro-phoretic display panel (EPD panel), and an electro-wetting display panel (EWD panel may be used as the display panel DP. When the non-light emitting display panel is used as the display panel DP, the display device DD may include a backlight unit for supplying light to the display panel DP. Hereinafter, embodiments in which the display panel DP includes an organic light emitting display panel will be described in more detail.

The touch sensor TS may be located on one surface of the display panel DP on which an image is displayed to receive a user's touch input. The touch sensor TS may obtain information about a touch input. The touch sensor TS may recognize a touch event of the display device DD through a user's hand or a separate input means. The touch sensor TS may recognize the touch event in a capacitive manner.

The touch sensor TS may sense the touch input using a mutual capacitance method or may sense the touch input using a self-capacitance method.

The window WD may be provided on the display module DM. The window WD may protect the display module DM from external impact, and may provide an input surface and/or a display surface to the user. The window WD may be coupled to the display module DM using an optically transparent adhesive member OCA.

According to some embodiments, the window WD may have a substrate or film structure. The window WD may have a single-layer structure or a multi-layer structure. All or part of the window WD may be flexible.

Figure 4:
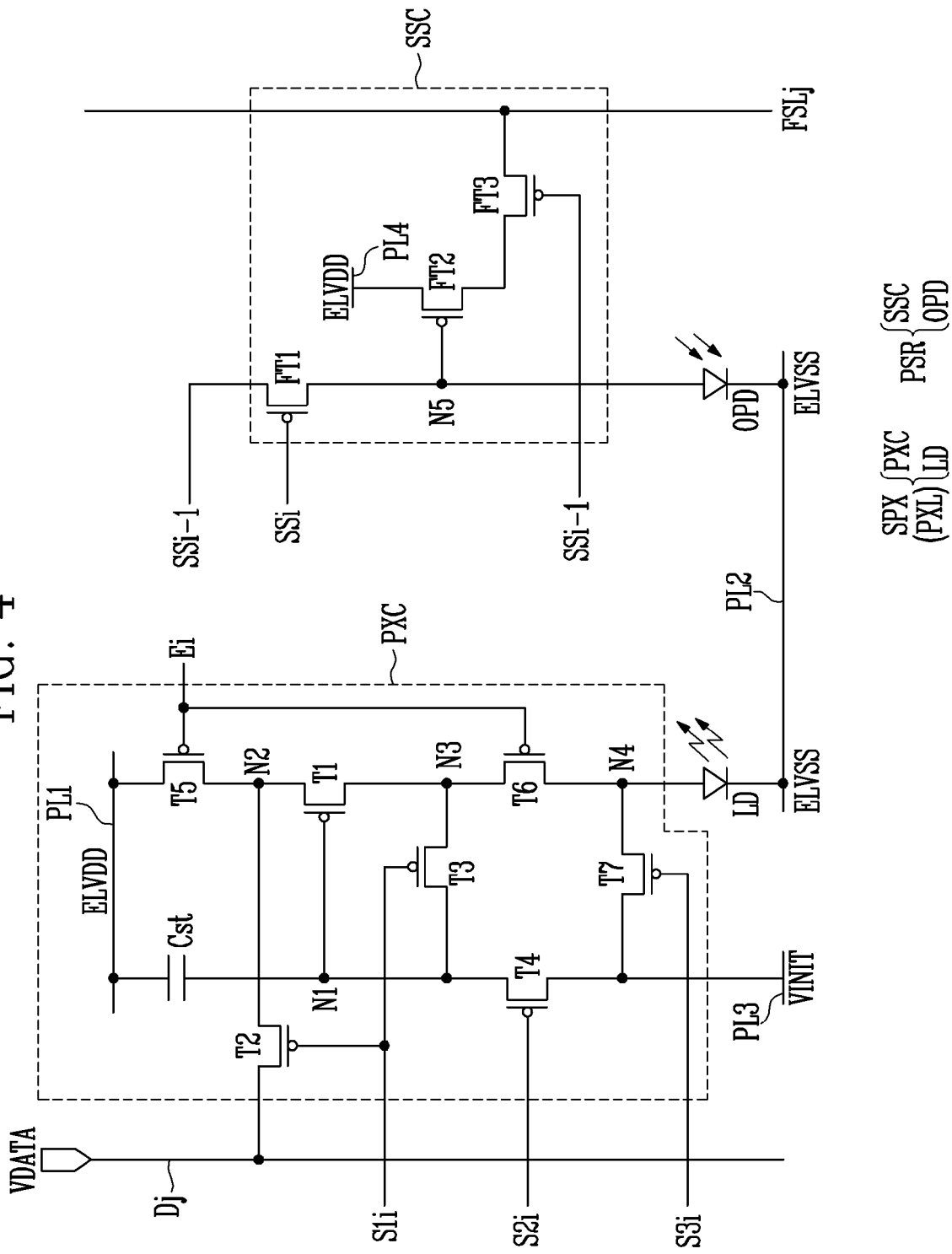
FIG. 4 is a circuit diagram schematically illustrating a sub-pixel and a photo-sensing pixel included in the display device according to some embodiments.

FIG. 4 is a circuit diagram schematically illustrating a sub-pixel and a photo-sensing pixel included in the display device according to some embodiments.

In FIG. 4, for convenience of description, a sub-pixel SPX (or a pixel PXL) located in an i-th pixel row (or an i-th horizontal line) and connected to a j-th data line Dj and a photo-sensing pixel PSR located in the i-th pixel row and connected to a j-th fingerprint sensing line FSLj (or a lead-out line) are shown, where i and j may be natural numbers.

Referring to FIG. 4, the sub-pixel SPX may include a pixel circuit PXC and a light emitting element LD connected thereto, and the photo-sensing pixel PSR may include a sensor circuit SSC and a light-receiving element OPD connected thereto.

One electrode (or an anode electrode) of the light emitting element LD may be connected to a fourth node N4, and the other electrode (or a cathode electrode) of the light emitting element LD may be connected to a second driving power source ELVSS. The light emitting element LD may generate light having a predetermined luminance in response to the amount of current (driving current) supplied from a first transistor T1.

According to some embodiments, the light emitting element LD may be an organic light emitting diode including an organic light emitting layer. According to some embodiments, the light emitting element LD may be an inorganic light emitting element formed of an inorganic material or a light emitting element composed of an inorganic material and an organic material in combination.

According to some embodiments, the light-receiving element OPD may obtain (or output) a sensing signal corresponding to the light emitted from the light emitting element LD. According to some embodiments, the light-receiving element OPD may be an organic photodiode. One electrode (or a first sensor electrode) of the light-receiving element OPD may be connected to a fifth node N5, and the other electrode (or a second sensor electrode) of the light-receiving element OPD may be connected to the second driving power source ELVSS. The light-receiving element OPD may generate carriers including free electrons and holes based on the intensity of light incident on the light-receiving layer, and may generate a current (photocurrent) by movement of the carriers.

The pixel circuit PXC may include a first transistor T1, a second transistor T2, and a storage capacitor Cst. According to some embodiments, the pixel circuit PXC may further include third to seventh transistors T3 to T7.

A gate electrode of the first transistor T1 (or a driving transistor) may be connected to a first node N1, a first electrode of the first transistor T1 may be connected to a second node N2, and a second electrode of the first transistor T1 may be connected to a third node N3.

The first transistor T1 may control the amount of current flowing from a first driving power source ELVDD to the second driving power source ELVSS via the light emitting element LD in response to a voltage of the first node N1. To this end, the first driving power source ELVDD may be set to a voltage higher than that of the second driving power source ELVSS.

The second transistor T2 (or a switching transistor) may be connected between the j-th data line Dj (hereinafter, referred to as a data line) connected to the pixel PXL and the second node N2. A gate electrode of the second transistor T2 may be connected to a first scan line S1i connected to the pixel PXL. The second transistor T2 may be turned on when a scan signal is supplied to the first scan line S1i to electrically connect the data line Dj and the second node N2.

The third transistor T3 (or a compensating transistor) may be connected between the second electrode (that is, the third node N3) and the gate electrode (that is, the first node N1) of the first transistor T1. A gate electrode of the third transistor T3 may be connected to the first scan line S1i. The third transistor T3 may be turned on when the scan signal is supplied to the first scan line S1i to electrically connect the second electrode and the gate electrode of the first transistor T1 (or the first node N1 and the third node N3). That is, the timing at which the second electrode of the first transistor T1 and the gate electrode of the first transistor T1 are connected to each other may be controlled by the scan signal. When the third transistor T3 is turned on, the first transistor T1 may be connected in a diode form.

The fourth transistor T4 (or a first initialization transistor) may be connected between the first node N1 (or the gate electrode of the first transistor T1) and a third power source line PL3 to which an initialization voltage VINIT is applied. A gate electrode of the fourth transistor T4 may be connected to a second scan line S2i. The fourth transistor T4 may be turned on in response to a scan signal supplied to the second scan line S2i to supply the initialization voltage VINIT to the first node N1. Here, the initialization voltage VINIT may be set to a voltage lower than a data voltage VDATA supplied to the data line Dj. Accordingly, a gate voltage of the first transistor T1 (or the first node N1) may be initialized to a first initialization voltage VINT1 as the fourth transistor T4 is turned on.

The fifth transistor T5 (or a first emission control transistor) may be connected between a first power source line PL1 (or a first driving voltage line) and the second node N2. A gate electrode of the fifth transistor T5 may be connected to an i-th emission control line Ei (hereinafter, referred to as an emission control line). The fifth transistor T5 may be turned on when an emission control signal is supplied to the emission control line Ei, and may be turned off in other cases.

The sixth transistor T6 (or a second emission control transistor) may be connected between the second electrode of the first transistor T1 (that is, the third node N3) and the fourth node N4. A gate electrode of the sixth transistor T6 may be connected to the emission control line Ei. The sixth transistor T6 may be controlled substantially the same as the fifth transistor T5.

The fifth transistor T5 and the sixth transistor T6 may be turned on in response to the emission control signal supplied through the emission control line Ei, and may form a path through which the driving current flows between the first power source line PL1 and the fourth node N4 (or between the first power source line PL1 and the second power source line PL2).

FIG. 4 shows embodiments in which the fifth transistor T5 and the sixth transistor T6 are connected to the same emission control line Ei. However, this is only an example, and the fifth transistor T5 and the sixth transistor T6 may be respectively connected to separate emission control lines to which different emission control signals are supplied.

The seventh transistor T7 (or a second initialization transistor) may be connected between the fourth node N4 and the third power source line PL3. A gate electrode of the seventh transistor T7 may be connected to a third scan line S3i. The seventh transistor T7 may be turned on when a scan signal is supplied to the third scan line S3i to supply the initialization voltage VINIT to the fourth node N4.

The storage capacitor Cst may be connected between the first power source line PL1 and the first node N1. The storage capacitor Cst may store a voltage corresponding to a voltage difference obtained by subtracting an absolute value of a threshold voltage of the first transistor T1 from a voltage of the first driving power source ELVDD by the first power source line PL1 and a data voltage applied to the first node N1.

According to some embodiments, after a scan signal is supplied to the second scan line S2$i$, a scan signal may be supplied to the first scan line S1$i$. For example, the scan signal supplied to the second scan line S2$i$ and the scan signal supplied to the first scan line S1$i$ may be supplied with a difference of one horizontal period. According to some embodiments, a scan signal may be simultaneously applied to the third scan line S3$i$ and the first scan line S1$i$. However, embodiments according to the present disclosure are not limited thereto, and after a scan signal is supplied to the third scan line S3$i$, a scan signal may be supplied to the first scan line S1$i$. For example, an interval between the scan signal supplied to the third scan line S3$i$ and the scan signal supplied to the first scan line S1$i$ may be one horizontal period. Alternatively, after a scan signal is supplied to the first scan line S1$i$, a scan signal may be supplied to the third scan line S3$i$.

The sensor circuit SSC may include a first sensor transistor FT1, a second sensor transistor FT2, and a third sensor transistor FT3.

The second sensor transistor FT2 and the third sensor transistor FT3 may be connected in series between a sensing power source line PL4 (or a fourth power source line) and the j-th fingerprint sensing line FSLj (hereinafter, referred to as a fingerprint sensing line).

The first sensor transistor FT1 may be connected between a previous sensing scan line SSi-1 and the fifth node N5 (or a first electrode of the light-receiving element OPD). A gate electrode of the first sensor transistor FT1 may be connected to an i-th sensing scan line SSi (hereinafter, referred to as a sensing scan line). The first sensor transistor FT1 may be turned on by a sensing scan signal supplied to the sensing scan line SSi to supply a voltage supplied to the previous sensing scan line SSi-1 to the fifth node N5. The first sensor transistor FT1 may be used to reset (or initialize) a voltage of the fifth node N5.

A gate electrode of the second sensor transistor FT2 may be connected to the fifth node N5. The second sensor transistor FT2 may generate a sensing current flowing from the sensing power source line PL4 to the fingerprint sensing line FSLj based on the voltage of the fifth node N5 by a photocurrent generated by the light-receiving element OPD.

According to some embodiments, a gate electrode of the third sensor transistor FT3 may be connected to an (i−1)th sensing scan line SSi-1 (hereinafter, referred to as a previous sensing scan line). The third sensor transistor FT3 may be turned on when a sensing scan signal is supplied to the previous sensing scan line SSi-1 to electrically connect the second sensor transistor FT2 and the fingerprint sensing line FSLj. Then, the sensing signal (sensing current) may be supplied to the fingerprint detector FPDP through the fingerprint sensing line FSLj.

The first to seventh transistors T1 to T7 included in the pixel circuit PXC and the first to third sensor transistors FT1 to FT3 included in the sensor circuit SSC may be P-type transistors (for example, PMOS transistors), but embodiments according to the present disclosure are not limited thereto. According to some embodiments, at least one of the first to seventh transistors T1 to T7 or the first to third sensor transistors FT1 to FT3 may be implemented as an N-type transistor (for example, an NMOS transistor). When the first to seventh transistors T1 to T7 and the first to third sensor transistors FT1 to FT3 are N-type transistors, positions of a source region (or a source electrode) and a drain region (or a drain electrode) may be changed to be opposite to each other.

FIG. 5 is a cross-sectional view schematically illustrating a display panel according to some embodiments.

Referring to FIG. 5, the display panel DP may include at least one sub-pixel SPX (or pixel PXL) and at least one photo-sensing pixel PSR.

The sub-pixel SPX may be located in a pixel area included in the display area DA. According to some embodiments, the pixel area may include an emission area EMA and a non-emission area NEMA adjacent to the emission area EMA. The photo-sensing pixel PSR may include a light-receiving area FXA and the non-emission area NEMA adjacent to the light-receiving area FXA.

The sub-pixel SPX may include a pixel circuit layer PCL, a display element layer DPL, and a thin film encapsulation layer TFE sequentially arranged on a substrate SUB. The photo-sensing pixel PSR may include the substrate SUB, the pixel circuit layer PCL, a sensor layer SSL, and the thin film encapsulation layer TFE sequentially arranged on the substrate SUB.

The pixel circuit layer PCL of the sub-pixel SPX may include a pixel circuit PXC provided on the substrate SUB and signal lines connected to the pixel circuit PXC. In addition, the pixel circuit layer PCL of the sub-pixel SPX may include at least one insulating layer positioned between components included in the pixel circuit PXC.

The display element layer DPL may be formed on the pixel circuit layer PCL of the sub-pixel SPX. The display element layer DPL may include a light emitting element LD emitting light. The light emitting element LD may include an anode electrode AE, the emission layer EML, and a cathode electrode CE. The light emitting element LD may be a top emission type organic light emitting element. The anode electrode AE may be electrically connected to the pixel circuit PXC.

The display element layer DPL of the sub-pixel SPX may include a pixel defining layer PDL including a first opening OP1 exposing a portion of the anode electrode AE. The pixel defining layer PDL may be provided on the anode electrode AE and the pixel circuit layer PCL. Also, the display element layer DPL may include a hole control layer HCL and an electron control layer ECL that are provided in the emission area EMA and the non-emission area NEMA. The hole control layer HCL may include a hole transporting layer and may further include a hole injection layer. The hole control layer HCL may be provided on the anode electrode AE exposed by the first opening OP1 of the pixel defining layer PDL, and the pixel defining layer PDL. The emission layer EML may be provided on at least the hole control layer HCL of the emission area EMA. The electron control layer ECL may be located on the emission layer EML. The electron control layer ECL may include an electron transporting layer and may further include an electron injection layer. The cathode electrode CE may be provided on the electron control layer ECL.

The pixel circuit layer PCL of the photo-sensing pixel PSR may include the sensor circuit SSC provided on the substrate SUB and signal lines connected to the sensor circuit SSC. Also, the pixel circuit layer PCL of the photo-sensing pixel PSR may include at least one insulating layer positioned between components included in the sensor circuit SSC.

The sensor layer SSL may be formed on the pixel circuit layer PCL of the photo-sensing pixel PSR. The sensor layer SSL may include the light-receiving element OPD receiving light. The light-receiving element OPD may include a first electrode E1, a light-receiving layer OPL, and a second electrode E2. The first electrode E1 may be electrically connected to the sensor circuit SSC.

The sensor layer SSL of the photo-sensing pixel PSR may include a pixel defining layer PDL including a second opening OP2 exposing a portion of the first electrode E1. The pixel defining layer PDL may be the pixel defining layer PDL of the sub-pixel SPX. The pixel defining layer PDL may be provided on the first electrode E1 and the pixel circuit layer PCL. Also, the sensor layer SSL may include a hole transporting layer HTL and an electron transporting layer ETL that are provided on the light-receiving area FXA and the non-emission area NEMA. The hole transporting layer HTL may be formed of the same material in the same process as the hole control layer HCL of the sub-pixel SPX. The hole transporting layer HTL may be located between the first electrode E1 and the light-receiving layer OPL. The light-receiving layer OPL may be located on at least the hole transporting layer HTL of the light-receiving area FXA. The electron transporting layer ETL may be formed of the same material in the same process as the electron control layer ECL of the sub-pixel SPX. The second electrode E2 may be provided on the electron control layer ECL.

According to some embodiments, the cathode electrode CE of the sub-pixel SPX and the second electrode E2 of the photo-sensing pixel PSR may be formed of the same material in the same process. Also, as shown in FIG. 4, the cathode electrode CE and the second electrode E2 may be electrically connected to the second power source line PL2 that transmits a voltage of the second driving power source ELVSS.

The thin film encapsulation layer TFE may be provided and/or formed on the display element layer DPL of the sub-pixel SPX and the sensor layer SSL of the photo-sensing pixel PSR.

The thin film encapsulation layer TFE may have a single-layer structure or a multi-layer structure. The thin film encapsulation layer TFE may include a plurality of insulating layers covering the light emitting element LD and the light-receiving element OPD. The thin film encapsulation layer TFE may include at least one inorganic layer and at least one organic layer. For example, the thin film encapsulation layer TFE may have a structure in which an inorganic layer and an organic layer are alternately stacked. According to some embodiments, the thin film encapsulation layer TFE may be an encapsulation substrate located on the light emitting element LD and the light-receiving element OPD and bonded to the substrate SUB through a sealant.

Figure 6:
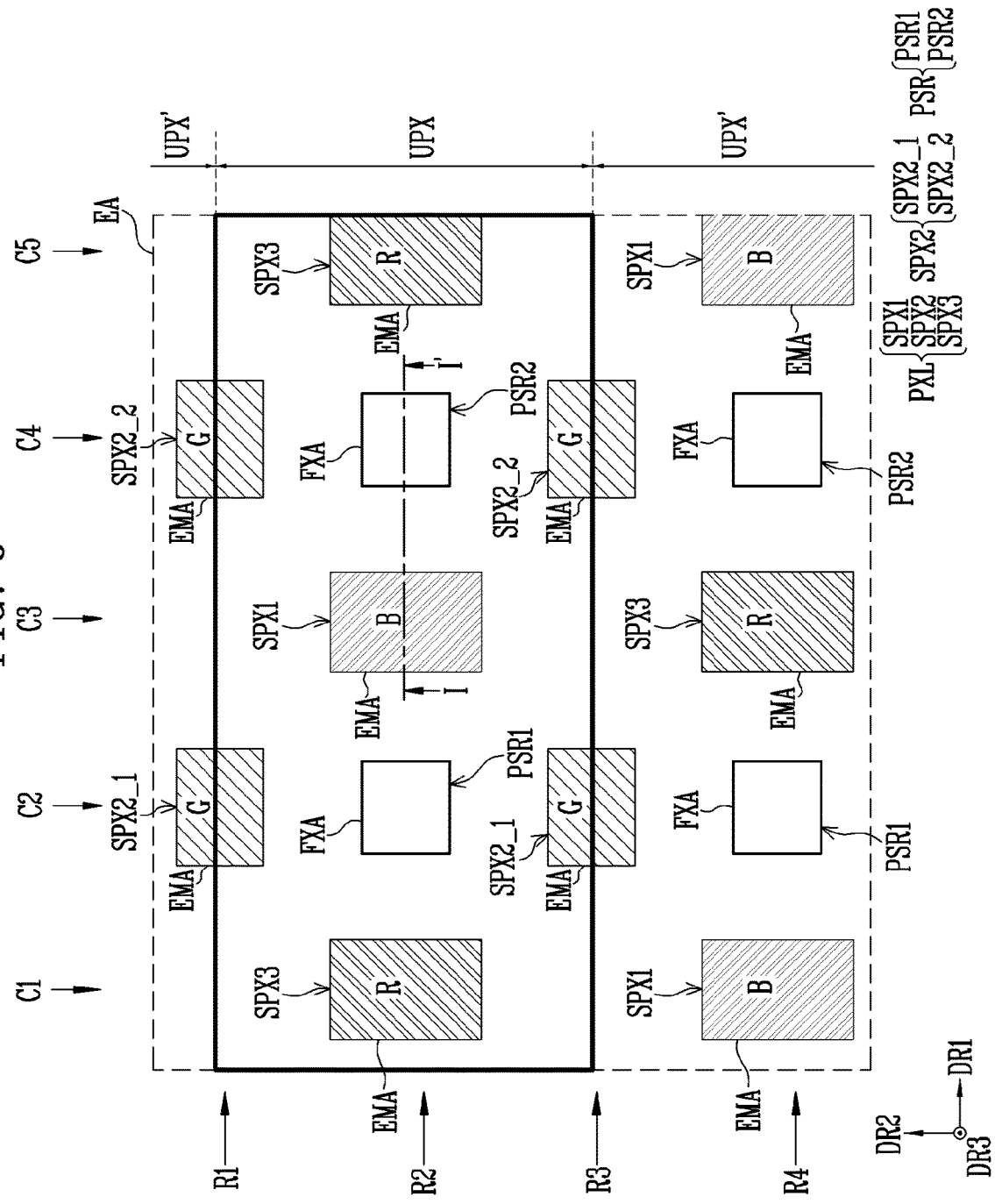
FIG. 6 is an enlarged view schematically illustrating an area EA of FIG. 2 according to some embodiments.

FIG. 6 is an enlarged view schematically illustrating an area EA of FIG. 2.

According to some embodiments, a first sub-pixel SPX1, a second sub-pixel SPX2, and a third sub-pixel SPX3 may correspond to the emission area EMA of each sub-pixel, and the emission area EMA may be defined by the first opening OP1 of the pixel defining layer PDL.

In addition, according to some embodiments, the photo-sensing pixel PSR may correspond to the light-receiving area FXA of the photo-sensing pixel PSR. The light-receiving area FXA may be defined by the second opening OP2 of the pixel defining layer PDL.

For convenience of description, in FIG. 6, a horizontal direction on a plane is indicated as the first direction DR1, and a vertical direction on a plane is indicated as the second direction DR2.

The sub-pixels SPX1, SPX2, and SPX3 (or the pixels PXL) located in the display area DA may be arranged in various structures. FIG. 6 shows embodiments in which, for example, the sub-pixels SPX1, SPX2, and SPX3 (or the pixels PXL) are arranged in a PENTILE™ structure. However, the sub-pixels SPX1, SPX2, and SPX3 may be arranged in various structures, and embodiments according to the present disclosure are not limited to the structure shown in FIG. 6.

The first sub-pixel SPX1 (or a first pixel), the second sub-pixel SPX2 (or a second pixel), and the third sub-pixel SPX3 (or a third pixel) may emit (provide) light of different colors from each other. For example, the first sub-pixel SPX1 may emit (or implement) blue light B, the second sub-pixel SPX2 may emit (or implement) green light G, and the third sub-pixel SPX3 may emit (or implement) red light R.

The second sub-pixel SPX2 may be arranged in a first row R1. The third sub-pixel SPX3, the photo-sensing pixel PSR, and the first sub-pixel SPX1 may be alternately arranged in a second row R2 adjacent to the first row R1 in the second direction DR2. The second sub-pixel SPX2 may be located in a third row R3 adjacent to the second row R2 in the second direction DR2. The first sub-pixel SPX1, the photo-sensing pixel PSR, and the third sub-pixel SPX3 may be alternately arranged in a fourth row R4 adjacent to the third row R3 in the second direction DR2.

According to some embodiments, the second sub-pixel SPX2 may include a (2_1)th sub-pixel SPX2_1 and a (2_2)th sub-pixel SPX2_2 arranged in different columns. The photo-sensing pixel PSR may include a first photo-sensing pixel PSR1 and a second photo-sensing pixel PSR2 arranged in different columns.

Second sub-pixels SPX2 located in the first row R1 may be arranged to cross each other with the first sub-pixel SPX1 and the third sub-pixel SPX3 located in the second row R2. Second sub-pixels SPX2 located in the third row R3 may be arranged to cross each other with the first sub-pixel SPX1 and the third sub-pixel SPX3 located in the second row R2. Second sub-pixels SPX2 located in the third row R3 may be arranged to cross each other with the first sub-pixel SPX1 and the third sub-pixel SPX3 located in the fourth row R4.

The third sub-pixel SPX3 located in the second row R2 and the first sub-pixel SPX1 located in the fourth row R4 may be positioned in the same column (for example, a first column C1). The (2_1)th sub-pixel SPX2_1 of the first row R1, the first photo-sensing pixel PSR1 of the second row R2, the (2_1)th sub-pixel SPX2_1 of the third row R3, and the first photo-sensing pixel PSR1 of the fourth row R4 may be located in a second column C2 adjacent to the first column C1 in the first direction DR1. The first sub-pixel SPX1 of the second row R2 and the third sub-pixel SPX3 of the fourth row R4 may be located in a third column C3 adjacent to the second column C2 in the first direction DR1. The (2_2)th sub-pixel SPX2_2 of the first row R1, the second photo-sensing pixel PSR2 of the second row R2, the (2_2)th sub-pixel SPX2_2 of the third row R3, and the second photo-sensing pixel PSR2 of the fourth row R4 may be located in a fourth column C4 adjacent to the third column C3 in the first direction DR1. The third sub-pixel SPX3 of the second row R2 and the first sub-pixel SPX1 of the fourth row R4 may be positioned in a fifth column C5 adjacent to the fourth column C4 in the first direction DR1.

Hereinafter, for convenience of description, the second sub-pixel SPX2 positioned in the second column C2 may be referred to as the (2_1)th sub-pixel SPX2_1, and the second sub-pixel SPX2 positioned in the fourth column C4 may be referred to as the (2_2)th sub-pixel SPX2_2.

A plurality of unit pixels UPX may be repeatedly arranged in the display area DA.

Each of the unit pixels UPX may include predetermined sub-pixels SPX1, SPX2, and SPX3 and predetermined photo-sensing pixels PSR.

For example, an unit pixel UPX may include the first and third sub-pixels SPX1 and SPX3, the first photo-sensing pixel PSR1, and the second photo-sensing pixel PSR2 located in the same row (for example, the second row R2) along the first direction DR1. The unit pixel UPX may include the (2_1)th sub-pixel SPX2_1 and the (2_2)th sub-pixel SPX2_2 located in the same row (for example, the first row R1) along the first direction DR1. In addition, the unit pixel UPX may include the (2_1)th sub-pixel SPX2_1 and the (2_2)th sub-pixel SPX2_2 located in the same row (for example, the third row R3) along the first direction DR1.

According to some embodiments, first photo-sensing pixels PSR1 may face each other with the (2_1)th sub-pixel SPX2_1 interposed therebetween. Second photo-sensing pixels PSR2 may face each other with the (2_2)th sub-pixel SPX2_2 interposed therebetween.

The unit pixel UPX and an adjacent unit pixel UPX' adjacent to the unit pixel UPX in the second direction DR2 may share the (2_1)th sub-pixel SPX2_1 and the (2_2)th sub-pixel SPX2_2. However, the unit pixel UPX and the adjacent unit pixel UPX' may be divided and defined in various ways.

Each of the first sub-pixel SPX1, the second sub-pixel SPX2, and the third sub-pixel SPX3 included in the unit pixel UPX may include the emission area EMA. Each of the first photo-sensing pixels PSR1 and the second photo-sensing pixels PSR2 included in a corresponding unit pixel UPX may include the light-receiving area FXA.

Figure 7:
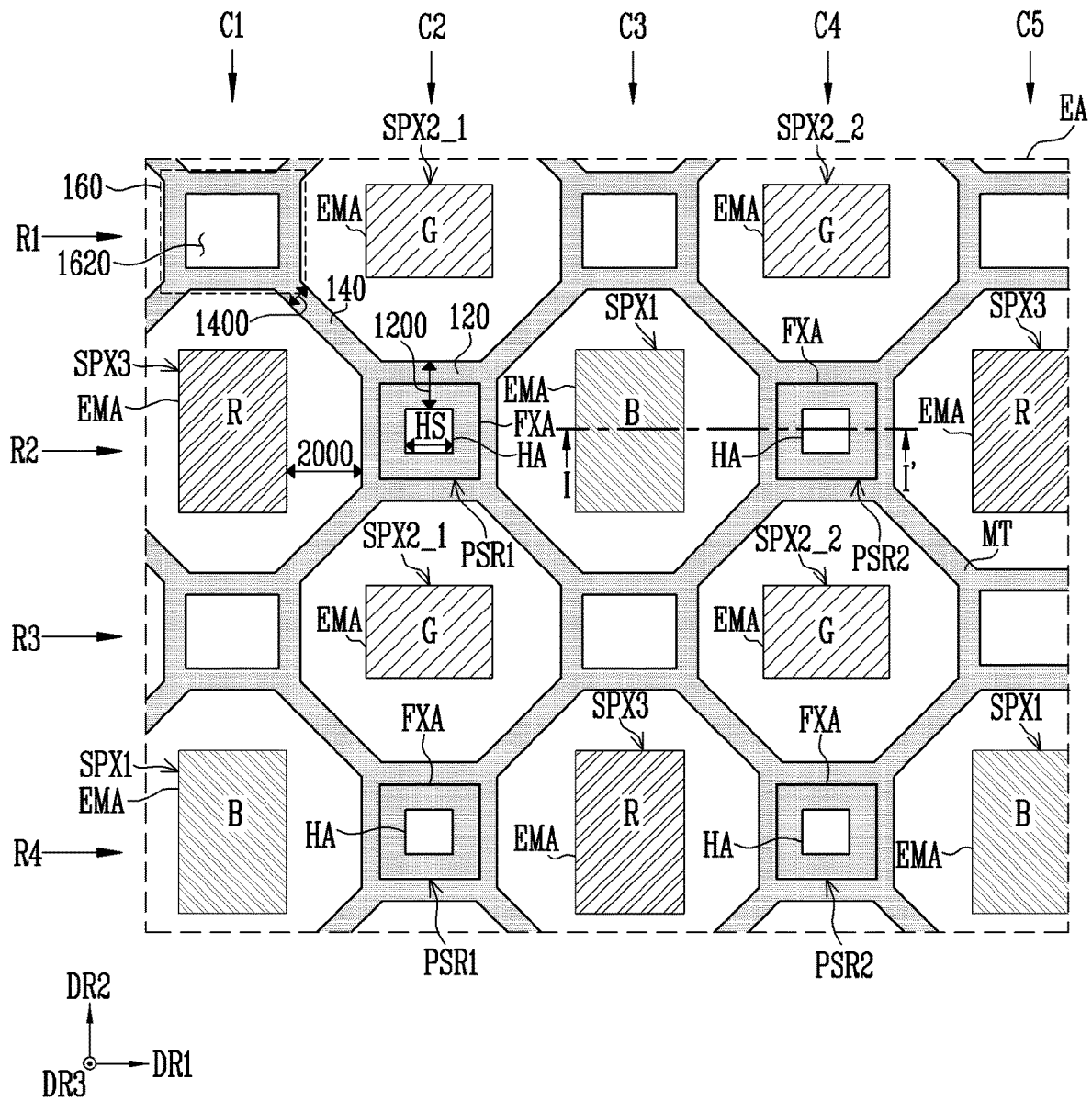
FIGS. 7 and 8 are enlarged views schematically illustrating the area EA of FIG. 2 to explain an arrangement structure of a conductive layer according to some embodiments.

According to some embodiments, each of the sub-pixels SPX1, SPX2, and SPX3 included in the unit pixel UPX may have the emission area EMA defined (or partitioned) by the pixel defining layer PDL. According to some embodiments, the emission area EMA may have various shapes. For example, the emission area EMA may have a rectangular shape (for example, a rhombus shape) or a hexagonal shape. As an example, FIG. 7 shows embodiments in which the emission area EMA has a rectangular shape. However, embodiments according to the present disclosure are not limited thereto.

According to some embodiments, each of the photo-sensing pixels PSR may have the light-receiving area FXA defined (or partitioned) by the pixel defining layer PDL. According to some embodiments, the light-receiving area FXA may have various shapes. For example, the light-receiving area FXA may have a rectangular shape (for example, a rhombus shape) or a hexagonal shape. As an example, FIG. 7 shows embodiments in which the light-receiving area FXA has a rectangular shape. However, embodiments according to the present disclosure are not limited thereto.

According to some embodiments, the emission area EMA of the first sub-pixel SPX1 may be an area in which blue light B is emitted, the emission area EMA of each of the second sub-pixels SPX2 may be an area in which green light G is emitted, and the emission area EMA of the third sub-pixel SPX3 may be an area in which red light R is emitted. The light-receiving area FXA of each of the photo-sensing pixels PSR may be an area receiving the light R, G, and B emitted from the first to third sub-pixels SPX1, SPX2, and SPX3.

According to some embodiments, the light-receiving area FXA may be adjacent to the first sub-pixel SPX1 (or the emission area EMA of the first sub-pixel SPX1) and the third sub-pixel SPX (or the emission area EMA of the third sub-pixel SPX3) in the first direction DR1. The light-receiving area FXA may be adjacent to the second sub-pixel SPX2 (or the emission area EMA of the second sub-pixel SPX2) in the second direction DR2.

Figure 8:
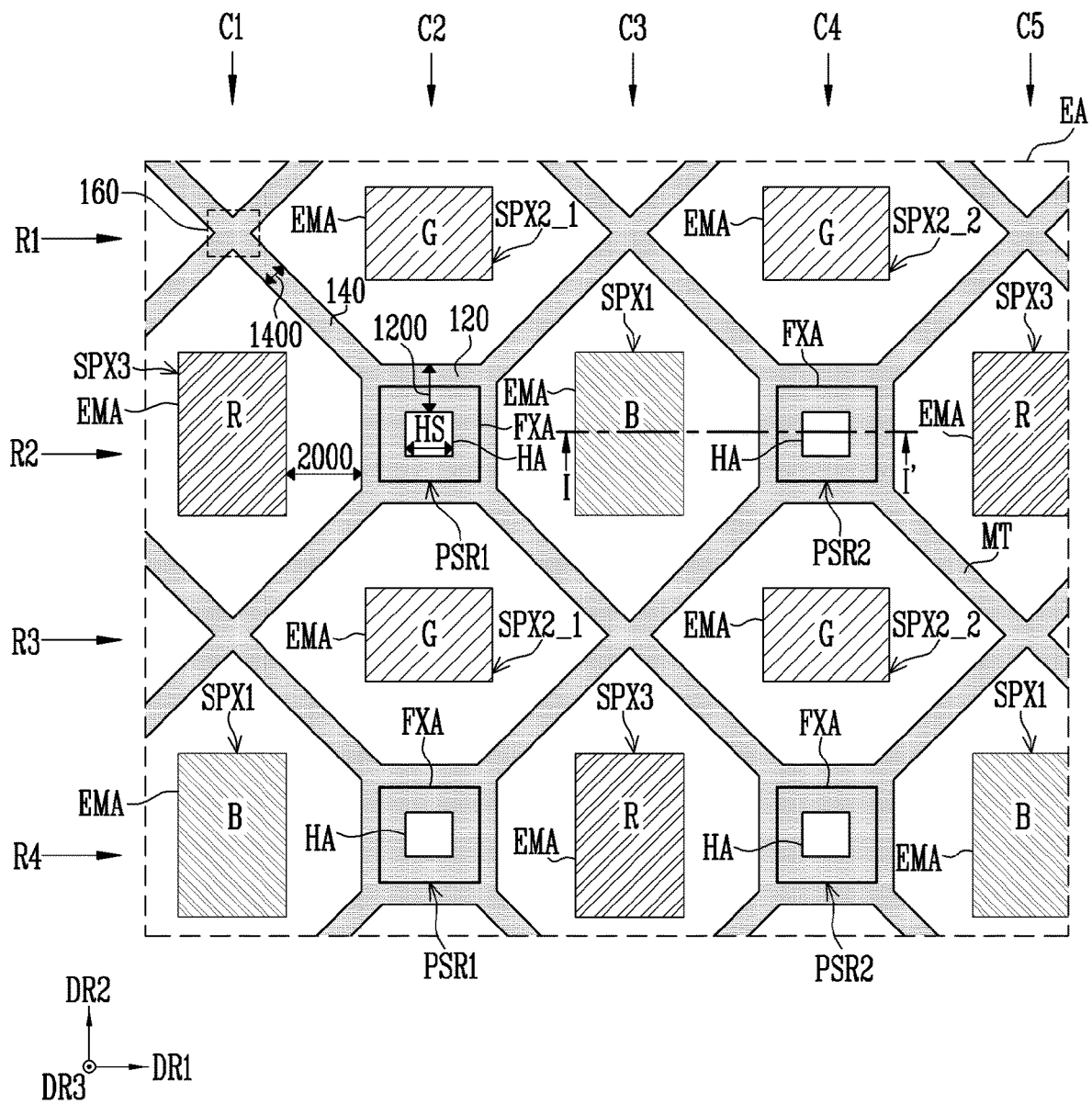

Next, a pattern structure for forming a hole area HA will be described with reference to FIGS. 7 and 8. FIGS. 7 and 8 are enlarged views schematically illustrating the area EA of FIG. 2 to explain an arrangement structure of a conductive layer. Contents that may overlap with those described above will be briefly described or omitted.

FIGS. 7 and 8 show embodiments in which a conductive layer MT is further included in the planar structure described with reference to FIG. 6. FIG. 7 may show an arrangement structure of a conductive layer MT according to some embodiments, and FIG. 8 may show an arrangement structure of a conductive layer MT according to some embodiments.

Referring to FIGS. 7 and 8, the display device DD may include the conductive layer MT arranged in a pattern (e.g., a set or predetermined pattern), and the conductive layer MT may form the hole area HA. According to some embodiments, the hole area HA may improve the sensing performance of the photo-sensing pixel PSR.

According to some embodiments, the conductive layer MT may be located (or patterned) to surround the emission area EMA. For example, a portion of the conductive layer MT may surround at least a portion of the emission area EMA (or the first to third sub-pixels SPX1, SPX2, and SPX3). According to some embodiments, the conductive layer MT may be arranged to be spaced apart from the emission area EMA by a distance 2000. The distance 2000 between the conductive layer MT and the emission area EMA may be determined in consideration of the emission efficiency of light emitted from the first to third sub-pixels SPX1, SPX2, and SPX3.

According to some embodiments, the conductive layer MT may define an opening to form the hole area HA. A portion of the conductive layer MT may surround at least a portion of the light-receiving area FXA (or the photo-sensing pixels PSR). For example, the conductive layer MT may be formed (or patterned) to surround a portion of the light-receiving area FXA along the hole area HA. The conductive layer MT may surround a portion of the light-receiving area FXA in the hole area HA in a plan view.

According to some embodiments, a portion of the conductive layer MT may overlap the light-receiving area FXA in a plan view. For example, a portion of the conductive layer MT may surround a portion (for example, a central region) of the light-receiving area FXA while overlapping the light-receiving area FXA.

According to some embodiments, the hole area HA may have various shapes. For example, the hole area HA may have a rectangular shape in a plan view. However, embodiments according to the present disclosure are not limited thereto. For example, the hole area HA may have another polygonal shape such as a hexagonal shape, or may have a circular shape.

According to some embodiments, a shape of the hole area HA may correspond to a shape of the light-receiving area FXA (or the photo-sensing pixel PSR). For example, when the light-receiving area FXA (or the photo-sensing pixel PSR) has a first shape, the hole area HA may have a second shape having the same shape as the first shape and having a different size. However, embodiments according to the present disclosure are not limited thereto. According to some embodiments, the hole area HA and the light-receiving area FXA (or the photo-sensing pixel PSR) may have different shapes.

According to some embodiments, in order to form the hole area HA, a portion of the conductive layer MT adjacent to the hole area HA may have a wider width than other portions of the conductive layer MT not adjacent to the hole area HA. For example, the conductive layer MT may include a first area 120 adjacent to the hole area HA and a second area 140 not adjacent to (or spaced apart from) the hole area HA. Here, the first area 120 of the hole area HA may mean an area in which at least a portion includes an area directly adjacent to the hole area HA. The second area 140 of the hole area HA may mean an area in which at least a portion includes an area not directly adjacent to the hole area HA.

For example, the first area 120 may have a first width 1200. The second area 140 may have a second width 1400. In this case, the first width 1200 may be greater than the second width 1400. The hole area HA having a size less than or equal to a predetermined size may be formed by patterning the conductive layer MT so that the thickness of the conductive layer MT has the first width 1200 (that is, has a thick width) at a position adjacent to the light-receiving area FXA.

According to some embodiments, the first area 120 of the conductive layer MT may surround a portion of the light-receiving area FXA (or the photo-sensing pixel PSR). The second area 140 of the conductive layer MT may surround the emission area EMA (or the first to third sub-pixels SPX1, SPX2, and SPX3).

Meanwhile, the conductive layer MT may further include a third area 160. The third area 160 may be an area connecting adjacent second areas 140. According to some embodiments, the third area 160 may be located between the (2_1)th sub-pixel SPX2_1 and the (2_2)th sub-pixel SPX2_2 adjacent to each other in the first direction DR1. The third area 160 may be located between the first sub-pixel SPX1 and the third sub-pixel SPX3 adjacent to each other in the second direction DR2.

According to some embodiments, the third area 160 of the conductive layer MT may have various shapes. For example, according to some embodiments (refer to FIG. 7), the third area 160 may have a shape forming an opening. For example, the third area 160 may have a polygonal shape forming an opening area 1620. As another example, according to some embodiments (refer to FIG. 8), the third area 160 may have a shape in which adjacent second areas 140 intersect each other without forming a separate opening area. However, a shape of the third area 160 of the conductive layer MT is not limited to the above-described example, and the third area 160 of the conductive layer MT may have various shapes.

According to some embodiments, the hole area HA may overlap the light-receiving area FXA (or the photo-sensing pixel PSR) as a whole (e.g., the entire light-receiving area FXA) in a plan view. Accordingly, the size of the hole area HA may be one parameter that determines the sensing performance of the photo-sensing pixel PSR.

According to some embodiments, the hole area HA may have a hole size HS defined by the first area 120 of the conductive layer MT. The hole size HS may mean a size (or diameter) of a shape defined by the hole area HA. For example, when the hole area HA has a circular shape, the hole size HS may be a diameter of the circle. When the hole area HA has an elliptical shape, the hole size HS may be a major radius of the ellipse. When the hole area HA has a rectangular shape, the hole size HS may mean a length of a diagonal of the square.

According to some embodiments, the hole size HS may have a micro-scale size. The hole size HS may be defined according to the hole area HA formed by a pattern structure of the conductive layer MT. Because the conductive layer MT is patterned by a wet etching process, the hole size HS may have a micro-scale size.

For example, the hole size HS may be 7.5 µm or less. Alternatively, according to some embodiments, the hole size HS may be 5.0 µm or less. Alternatively, according to some embodiments, the hole size HS may be 3.0 µm or less. According to some embodiments, the hole size HS may be 0.1 µm or more while satisfying the above-described numerical range. However, embodiments according to the present disclosure are not limited thereto.

According to some embodiments, the hole size HS may be smaller than the distance 2000 between the conductive layer MT and the emission area EMA (or the first to third sub-pixels SPX1, SPX2, and SPX3) in a plan view. According to some embodiments, while the hole size HS satisfies the above-described numerical range, the distance 2000 may be 8.0 µm or more and 15 µm or less. However, embodiments according to the present disclosure are not limited thereto.

According to some embodiments, in order to secure the sensing performance of the photo-sensing pixel PSR, the hole size HS overlapping the light-receiving area FXA needs to satisfy the above-described numerical range. According to some embodiments, by forming the hole area HA using the conductive layer MT that can be patterned by a wet etching process, the hole area HA satisfying the above-described numerical range can be provided. For example, according to the prior art, a predetermined hole structure may be formed by using a light blocking pattern LBP. However, the light blocking pattern LBP may include an organic material (for example, a black matrix or the like) in order to sufficiently secure the light blocking performance. When the organic material is patterned, it may be difficult to form the hole structure at a predetermined interval or less. However, according to some embodiments, by forming the hole area HA using a metal pattern, the hole area HA satisfying the above-described numerical range may be provided, and accordingly, the sensing performance of the photo-sensing pixel PSR can be sufficiently secured.

Meanwhile, the conductive layer MT may form a sensor pattern of the touch sensor TS while forming the hole area HA.

As described above, the display device DD may include the touch sensor TS configured to receive a user's touch input. According to some embodiments, the touch sensor TS may include a first sensor pattern and a second sensor pattern. Here, the touch sensor TS may obtain information about the user's touch input based on information about a change in capacitance formed between the first sensor pattern and the second sensor pattern. For example, the first sensor pattern may be a driving electrode, and the second sensor pattern may be a receiving electrode. Alternatively, the first sensor pattern may be a receiving electrode, and the second sensor pattern may be a driving electrode.

Here, according to some embodiments, the conductive layer MT may constitute the first sensor pattern and/or the second sensor pattern. For example, the display device DD may include a first conductive layer MT1 (refer to FIG. 9) and a second conductive layer MT2 (refer to FIG. 9) for constituting touch electrodes. The first conductive layer MT1 and/or the second conductive layer MT2 may constitute the first sensor pattern and/or the second sensor pattern. For example, the first conductive layer MT1 and the second conductive layer MT2 may constitute the first sensor pattern, and the first conductive layer MT1 and the second conductive layer MT2 may constitute the second sensor pattern. However, embodiments according to the present disclosure are not limited thereto.

According to some embodiments, as described above with reference to FIGS. 7 and 8, a patterned structure of the conductive layer MT may be formed by the first conductive layer MT1 and/or the second conductive layer MT2. For example, the patterned structure of the conductive layer MT may be formed by the second conductive layer MT2. The patterned structure of the conductive layer MT may be formed by the first conductive layer MT1. Alternatively, the patterned structure of the conductive layer MT may be formed by the first conductive layer MT1 and the second conductive layer MT2. Hereinafter, for convenience of description, the patterned structure of the conductive layer MT will be described as being formed by the second conductive layer MT2.

Hereinafter, a stacked structure of each of the sub-pixels SPX1, SPX2, and SPX3 including the light emitting element LD and a stacked structure of each of the photo-sensing pixels PSR including the light-receiving element OPD will be mainly described with reference to FIGS. 9 and 10. Contents that may overlap with those described above will be briefly described or omitted.

Figure 9:
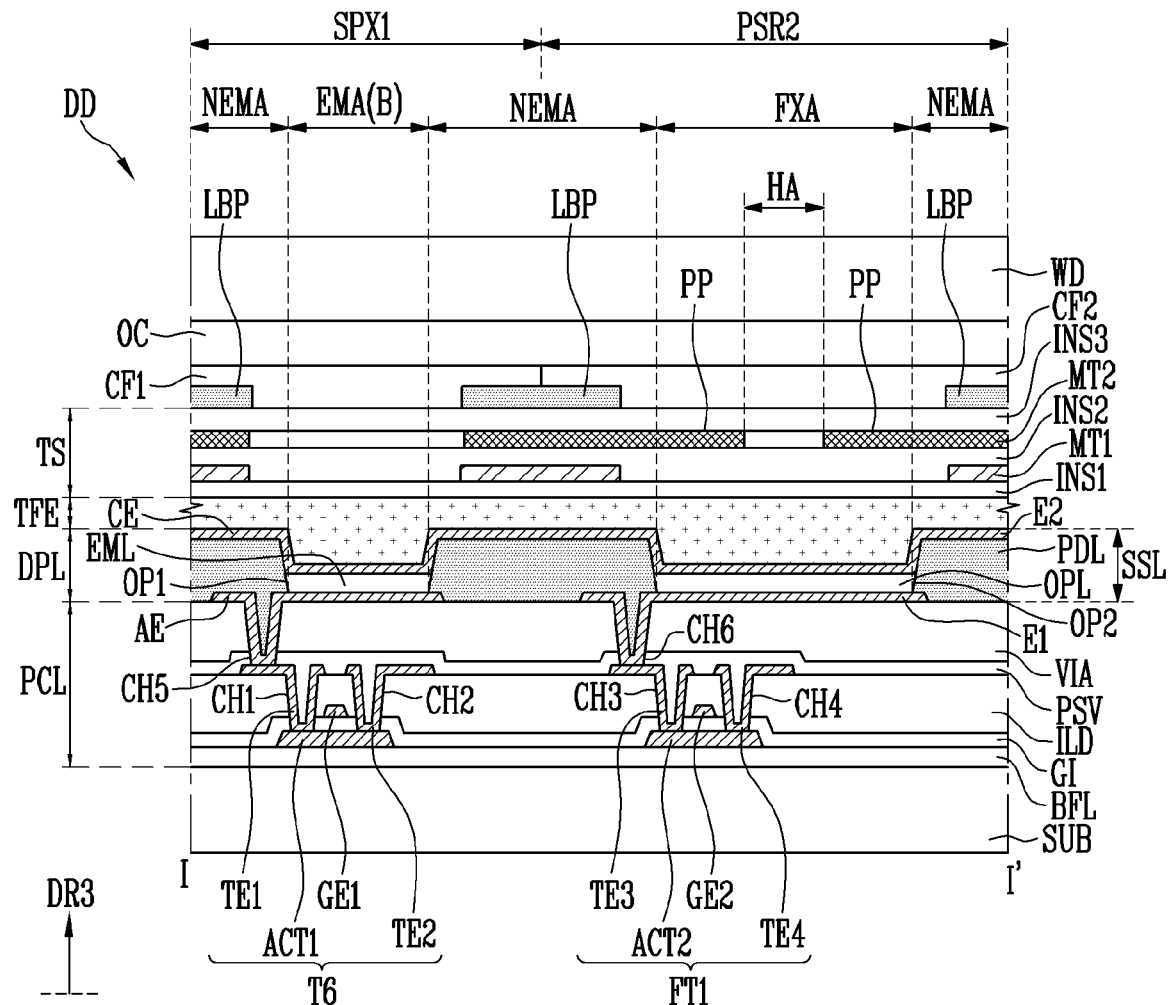
FIGS. 9 and 10 are schematic cross-sectional views taken along the line I-I' of FIG. 6 according to some embodiments.
Figure 10:
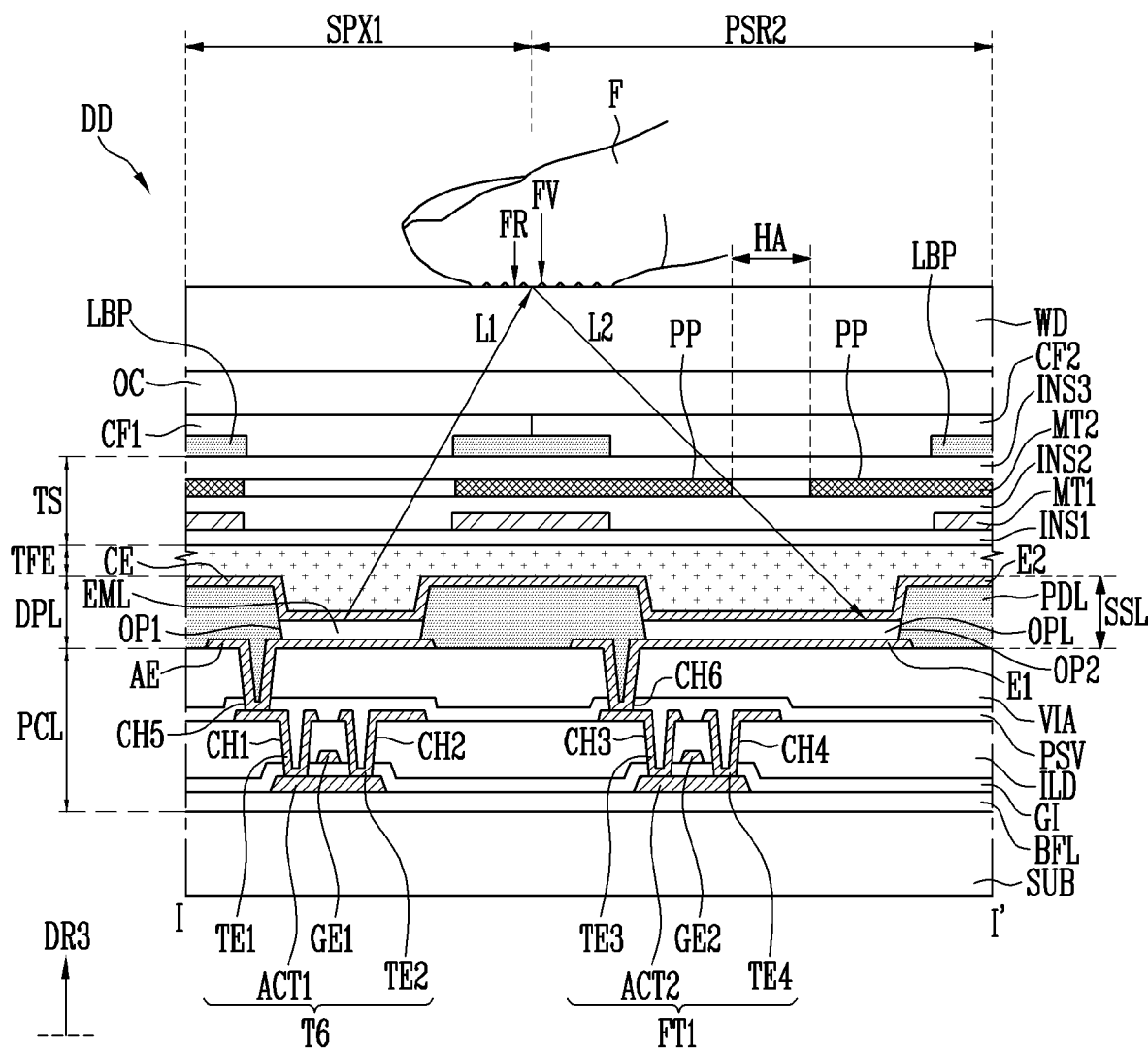

FIGS. 9 and 10 are schematic cross-sectional views taken along line I-I' of FIG. 6. In this case, FIG. 10 may be a schematic cross-sectional view illustrating a state in which a user's fingerprint is sensed.

In FIGS. 9 and 10, for convenience of description, a cross-sectional structure of each sub-pixel will be described by taking the first sub-pixel SPX1 among the sub-pixels SPX1, SPX2, and SPX3 as an example. In FIGS. 9 and 10, for convenience of description, a cross-sectional structure of each photo-sensing pixel PSR will be described by taking the second photo-sensing pixel PSR2 among the photo-sensing pixels PSR as an example.

In addition, in FIGS. 9 and 10, only a cross-section of a portion corresponding to the sixth transistor T6 among the first to seventh transistors T1 to T7 shown in FIG. 4 and a cross-section of a portion corresponding to the first sensor transistor FT1 among the first to third sensor transistors FT1 to FT3 are shown as an example.

Referring to FIGS. 9 and 10, the display device DD may include the first sub-pixel SPX1 and the second photo-sensing pixel PSR2 located on the substrate SUB.

The substrate SUB may form a base surface. According to some embodiments, the substrate SUB may include a transparent insulating material to transmit light. The substrate SUB may be a rigid substrate or a flexible substrate. The rigid substrate may be, for example, one of a glass substrate, a quartz substrate, a glass ceramic substrate, and a crystalline glass substrate. The flexible substrate may be one of a film substrate including a polymer organic material and a plastic substrate. For example, the flexible substrate may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, or cellulose acetate propionate. However, embodiments according to the present disclosure are not limited thereto.

The pixel circuit layer PCL of the first sub-pixel SPX1 and the pixel circuit layer PCL of the second photo-sensing pixel PSR2 may be provided on the substrate SUB. The pixel circuit layer PCL may include a buffer layer BFL, a gate insulating layer GI, an interlayer insulating layer ILD, a passivation layer PSV, and a via layer VIA sequentially stacked on the substrate SUB along the third direction DR3.

The buffer layer BFL may prevent or reduce instances of impurities diffusing into the sixth transistor T6 included in the pixel circuit PXC and the first sensor transistor FT1 included in the sensor circuit SSC. The buffer layer BFL may be an inorganic insulating layer including an inorganic material. The buffer layer BFL may include at least one of silicon nitride (SiNx), silicon oxide (SiOx), silicon oxynitride (SiOxNy), or a metal oxide such as aluminum oxide (AlOx). The buffer layer BFL may be provided as a single layer, but may also be provided as a multilayer of at least a double layer. When the buffer layer BFL is provided as a multilayer, each layer may be formed of the same material or may be formed of different materials. The buffer layer BFL may be omitted depending on the material and process conditions of the substrate SUB.

A semiconductor layer (or semiconductor pattern) including a first active pattern ACT1 and a second active pattern ACT2 may be located on the buffer layer BFL. The semiconductor layer may include a polysilicon semiconductor. For example, the semiconductor layer may be formed through a low-temperature polysilicon process (for example, an LTPS process). However, embodiments according to the present disclosure are not limited thereto, and at least a portion of the semiconductor layer may be formed of an oxide semiconductor, a metal oxide semiconductor, or the like.

Each of the first and second active patterns ACT1 and ACT2 may include a channel region, a first contact region connected to one end of the channel region, and a second contact region connected to the other end of the channel region. The channel region, the first contact region, and the second contact region may be formed of a semiconductor layer not doped with impurities or doped with impurities. For example, the first contact region and the second contact region may be formed of a semiconductor layer doped with impurities, and the channel region may be formed of a semiconductor layer that is not doped with impurities. As the impurities, for example, p-type impurities may be used, but embodiments according to the present disclosure are not limited thereto. One of the first and second contact regions may be a source region, and the other may be a drain region.

The gate insulating layer GI may be provided and/or formed entirely on the first and second active patterns ACT1 and ACT1 and the buffer layer BFL.

The gate insulating layer GI may be an inorganic layer (or an inorganic insulating layer) including an inorganic material. For example, the gate insulating layer GI may include at least one of silicon nitride (SiNx), silicon oxide (SiOx), silicon oxynitride (SiOxNy), or a metal oxide such as aluminum oxide (AlOx). However, the material of the gate insulating layer GI is not limited to the above-described embodiments. According to some embodiments, the gate insulating layer GI may be formed of an organic layer (or an organic insulating layer) including an organic material. The gate insulating layer GI may be provided as a single layer, but may also be provided as a multilayer of at least a double layer.

A first gate electrode GE1 and a second gate electrode GE2 may be provided and/or formed on the gate insulating layer GI. The first gate electrode GE1 may be provided and/or formed on the gate insulating layer GI to correspond to the channel region of the first active pattern ACT1, and the second gate electrode GE2 may be provided and/or formed on the gate insulating layer GI to correspond to the channel region of the second active pattern ACT2. The first and second gate electrodes GE1 and GE2 may be formed of a single layer made of one selected from the group consisting of copper (Cu), molybdenum (Mo), tungsten (W), aluminum neodymium (AlNd), titanium (Ti), aluminum (Al), silver (Ag), and alloys thereof, or a mixture thereof. Also, the first and second gate electrodes GE1 and GE2 may be formed in a double layer or multilayer structure made of a low-resistance material such as molybdenum (Mo), titanium (Ti), copper (Cu), aluminum (Al) or silver (Ag) in order to reduce resistance of wirings.

The interlayer insulating layer ILD may be entirely provided and/or formed on the first and second gate electrodes GE1 and GE2 and the gate insulating layer GI.

The interlayer insulating layer ILD may include the same material as the gate insulating layer GI or may include one or more materials selected from the materials illustrated as materials constituting the gate insulating layer GI.

First, second, third, and fourth connecting members TE1, TE2, TE3, and TE4 may be provided and/or formed on the interlayer insulating layer ILD.

The first, second, third, and fourth connecting members TE1, TE2, TE3, and TE4 may be located on the interlayer insulating layer ILD to be spaced apart from each other. The first, second, third, and fourth connecting members TE1, TE2, TE3, and TE4 may be transistor electrodes.

The first connecting member TE1 may contact the first contact region of one end of the first active pattern ACT1 through a first contact hole CH1 formed in the interlayer insulating layer ILD and the gate insulating layer GI. When the first contact region is a source region, the first connecting member TE1 may be a first source electrode.

The second connecting member TE2 may contact the second contact region of the other end of the first active pattern ACT1 through a second contact hole CH2 formed in the interlayer insulating layer ILD and the gate insulating layer GI. When the second contact region is a drain region, the second connecting member TE2 may be a first drain electrode.

The third connecting member TE3 may contact the first contact region of one end of the second active pattern ACT2 through a third contact hole CH3 formed in the interlayer insulating layer ILD and the gate insulating layer GI. When the first contact region is a source region, the third connecting member TE3 may be a second source electrode.

The fourth connecting member TE4 may contact the second contact region of the other end of the second active pattern ACT2 through a fourth contact hole CH4 formed in the interlayer insulating layer ILD and the gate insulating layer GI. When the second contact region is a drain region, the fourth connecting member TE4 may be a second drain electrode.

The first to fourth connecting members TE1 to TE4 may include the same material as the first and second gate electrodes GE1 and GE2 or may include one or more materials selected from the materials illustrated as materials constituting the first and second gate electrodes GE1 and GE2.

The passivation layer PSV may be provided (or formed) entirely on the first to fourth connecting members TE1 to TE4 and the interlayer insulating layer ILD.

The passivation layer PSV (for example, a protective layer) may be an inorganic layer (or an inorganic insulating layer including an inorganic material or an organic layer (or an organic insulating layer) including an organic material. The inorganic layer may include, for example, at least one of silicon oxide (SiOx), silicon nitride (SiNx), silicon oxynitride (SiOxNy), or a metal oxide such as aluminum oxide (AlOx). The organic layer may include, for example, at least one of an acrylic resin (polyacrylates resin), an epoxy resin, a phenolic resin, a polyamides resin, a polyimides resin, an unsaturated polyester resin, a poly-phenylen ethers resin, a poly-phenylene sulfides resin, or a benzocyclobutene resin.

According to some embodiments, the passivation layer PSV may include the same material as the interlayer insulating layer ILD, but embodiments according to the present disclosure are not limited thereto. The passivation layer PSV may be provided as a single layer, but may also be provided as a multilayer of at least a double layer.

The passivation layer PSV may be partially opened to include a fifth contact hole CH5 exposing an area of the first connecting member TE1 and a sixth contact hole CH6 exposing an area of the third connecting member TE3.

The via layer VIA may be provided and/or formed entirely on the passivation layer PSV.

The via layer VIA may be partially opened to include fifth and sixth contact holes CH5 and CH6 respectively corresponding to the fifth and sixth contact holes CH5 and CH6 of the passivation layer PSV. The via layer VIA may include the same material as the passivation layer PSV or may include one or more materials selected from the materials illustrated as materials constituting the passivation layer PSV. According to some embodiments, the via layer VIA may be an organic layer made of an organic material.

FIGS. 9 and 10 show embodiments in which the via layer VIA is provided on the passivation layer PSV, but embodiments according to the present disclosure are not limited thereto. According to some embodiments, one of the passivation layer PSV and the via layer VIA may be omitted.

The display element layer DPL may be provided and/or formed on the pixel circuit layer PCL of the first sub-pixel SPX1, and the sensor layer SSL may be provided and/or formed on the pixel circuit layer PCL of the second photo-sensing pixel PSR2.

The display element layer DPL may include the light emitting element LD and the pixel defining layer PDL. The light emitting element LD may include the anode electrode AE (or a first pixel electrode), the emission layer EML, and the cathode electrode CE (or a second pixel electrode). The light emitting element LD may be electrically connected to the sixth transistor T6 of the pixel circuit PXC.

The sensor layer SSL may include the light-receiving element OPD and the pixel defining layer PDL. The light-receiving element OPD may be an optical fingerprint sensor. For example, the light-receiving element OPD may include one selected from the group consisting of a photo diode, a CMOS image sensor, a CCD camera, and a photo transistor. However, embodiments according to the present disclosure are not necessarily limited thereto. The light-receiving element OPD may recognize a fingerprint by sensing light reflected by ridges FR of a finger F and valleys FV between the ridges FR. For example, when a user's finger F touches the window WD, a first light L1 emitted from the light emitting element LD (or the emission layer EML) may be reflected by the ridges FR or the valleys FV of the finger F, and a second light L2 reflected by the ridges FR or the valleys FV may reach the light-receiving element OPD (or the light-receiving layer OPL) of the sensor layer SSL. The light-receiving element OPD may recognize a pattern of the user's fingerprint by distinguishing the second light L2 reflected by the ridges FR of the finger F and the second light L2 reflected by the valleys FV of the finger F.

The light-receiving element OPD may be electrically connected to the first sensor transistor FT1 of the sensor circuit SSC. The light-receiving element OPD may include the first electrode E1 (or the first sensor electrode), the light-receiving layer OPL (or a photoelectric conversion layer), and the second electrode E2 (or the second sensor electrode).

The anode electrode AE and the first electrode E1 may be formed of a metal layer made of Ag, Mg, Al, Pt, Pd, Au, Ni, Nd, Ir, Cr, or an alloy thereof. Alternatively, the anode electrode AE and the first electrode E1 may be formed of indium tin oxide (ITO), indium zinc oxide (IZO), zinc oxide (ZnO), indium tin zinc oxide (ITZO), or the like. The anode electrode AE may be electrically connected to the sixth transistor T6 through the fifth contact hole CH5 formed in the via layer VIA and the passivation layer PSV. The first electrode E1 may be electrically connected to the first sensor transistor FT1 through the sixth contact hole CH6 formed in the via layer VIA and the passivation layer PSV.

The anode electrode AE and the first electrode E1 may be simultaneously formed in the same process using a mask, but embodiments according to the present disclosure are not necessarily limited thereto.

The pixel defining layer PDL (or a bank) may be entirely provided and/or formed on the anode electrode AE, the first electrode E1, and the via layer VIA.

The pixel defining layer PDL may define (or partition) the emission area EMA of the first sub-pixel SPX1 and the light-receiving area FXA of the second photo-sensing pixel PSR2. The pixel defining layer PDL may be an organic insulating layer made of an organic material. The organic material may include an acryl resin, an epoxy resin, a phenolic resin, a polyamide resin, a polyimide resin, and the like.

According to some embodiments, the pixel defining layer PDL may include a light absorbing material or may be coated with a light absorbing agent to absorb light introduced from outside. For example, the pixel defining layer PDL may include a carbon-based black pigment. However, embodiments according to the present disclosure are not limited thereto, and the pixel defining layer PDL may include an opaque metal material having high light absorption such as chromium (Cr), molybdenum (Mo), an alloy (MoTi) of molybdenum (Mo) and titanium (Ti), tungsten (W), vanadium (V), niobium (Nb), tantalum (Ta), manganese (Mn), cobalt (Co) or nickel (Ni).

The pixel defining layer PDL may include the first opening OP1 exposing one area (for example, a portion of an upper surface) of the anode electrode AE and the second opening OP2 exposing one area (for example, a portion of an upper surface) of the first electrode E1. Also, the pixel defining layer PDL may protrude from the via layer VIA in the third direction DR3 along a perimeter of the emission area EMA and a perimeter of the light-receiving area FXA.

The first opening OP1 of the pixel defining layer PDL may correspond to the emission area EMA, and the second opening OP2 of the pixel defining layer PDL may correspond to the light-receiving area FXA.

The emission layer EML may be provided and/or formed on the anode electrode AE exposed by the first opening OP1 of the pixel defining layer PDL. The emission layer EML may include an organic material to emit light of a predetermined color (for example, blue light B). For example, the emission layer EML may include a hole transporting layer, an organic material layer, and an electron transporting layer.

The light-receiving layer OPL may be provided and/or formed on the first electrode E1 exposed by the second opening OP2 of the pixel defining layer PDL. The light-receiving layer OPL may be a layer including the light-receiving element OPD. The light-receiving layer OPL may absorb and detect the second light L2 reflected or scattered from the fingerprint of the user's finger F. In this case, the light-receiving layer OPL may recognize the fingerprint by sensing a difference in the amount of light reflected or scattered by the ridges FR or valleys FV of the fingerprint of the user's finger F. Holes and electrons generated when the light-receiving layer OPL absorbs light may be transmitted to the cathode electrode CE and the second electrode E2, respectively.

The light-receiving layer OPL may be formed of an organic photosensitive material. For example, the organic photosensitive material may include a dithiolene-based material (BDN) (bis(4-dimethylaminodithiobenzypnickel (II)), a benzotriazole-based high molecular compound (PTZBTTT-BDT), a porphyrin-based small molecule material (DHTBTEZP), and the like. However, embodiments according to the present disclosure are not limited thereto. An electron transporting layer may be provided on the emission layer EML and the light-receiving layer OPL.

The cathode electrode CE may be provided and/or formed on the emission layer EML of the first sub-pixel SPX1, and the second electrode E2 may be provided and/or formed on the light-receiving layer OPL of the first photo-sensing pixel PSR1. According to some embodiments, the cathode electrode CE and the second electrode E2 may be a common electrode integrally formed in the display area DA. The voltage of the second driving power source ELVSS may be supplied to the cathode electrode CE and the second electrode E2.

The cathode electrode CE and the second electrode E2 may be made of a metal such as Ag, Mg, Al, Pt, Pd, Au, Ni, Nd, Ir, Cr, or the like, or a transparent conductive material such as ITO, IZO, ZnO, ITZO, or the like. According to some embodiments, the cathode electrode CE and the second electrode E2 may be formed of a double layer or more including a metal thin film. For example, the cathode electrode CE and the second electrode E2 may be formed of a triple layer having an ITO/Ag/ITO structure.

The thin film encapsulation layer TFE may be provided and/or formed entirely on the cathode electrode CE and the second electrode E2.

Because the thin film encapsulation layer TFE may be the same component as the thin film encapsulation layer TFE described with reference to FIG. 5, a description thereof will be omitted.

The light blocking pattern LBP may be provided and/or formed on the thin film encapsulation layer TFE to correspond to the non-emission area NEMA of the first sub-pixel SPX1 and the non-emission area NEMA of the first photo-sensing pixel PSR1.

The light blocking pattern LBP may include a light blocking material that prevents or reduces light leakage between the first sub-pixel SPX1 and a sub-pixel adjacent thereto. For example, the light blocking pattern LBP may include a black matrix. However, embodiments according to the present disclosure are not limited thereto. According to some embodiments, the light blocking pattern LBP may include at least one of carbon black (CB) or titanium black (TiBK). Also, the light blocking pattern LBP may prevent or reduce color mixing of light emitted from the first sub-pixel SPX1 and each of the sub-pixels adjacent thereto.

In the first sub-pixel SPX1, the light blocking pattern LBP may be partially opened so as not to overlap the emission area EMA. The opening of the light blocking pattern LBP may provide an optical path so that the first light L1 emitted from the light emitting element LD may travel to an upper portion of the display device DD. To this end, the opening of the light blocking pattern LBP may be arranged to overlap the light emitting element LD (or the emission area EMA).

In the second photo-sensing pixel PSR2, the light blocking pattern LBP may be partially opened so as not to overlap the light-receiving area FXA. The opening of the light blocking pattern LBP may provide an optical path so that the second light L2 reflected from the fingerprint of the user's finger F may travel to the light-receiving element OPD. To this end, the opening of the light blocking pattern LBP may be arranged to overlap the light-receiving element OPD (or the light-receiving area FXA).

The touch sensor TS may be positioned on the thin film encapsulation layer TFE.

The touch sensor TS may include a first insulating layer INS1, a second insulating layer INS2, a third insulating layer INS3, and the first and second conductive layers MT1 and MT2. Each of the above-described layers may be formed of a single layer, but embodiments according to the present disclosure are not limited thereto. According to some embodiments, each of the above-described layers may be composed of a stacked layer including a plurality of layers. Another layer may be further located between the above-described layers.

The first insulating layer INS1 may include an inorganic insulating layer including an inorganic material or an organic insulating layer including an organic material. The inorganic insulating layer may include an inorganic insulating material such as silicon oxide (SiOx), silicon nitride (SiNx), silicon oxynitride (SiOxNy), aluminum oxide (AlxOy), titanium oxide (TiOx), tantalum oxide (TaxOy), hafnium oxide (HfOx), zinc oxide (ZnOx), or the like. The organic insulating layer may include at least one of an acrylic resin, a methacrylic resin, a polyisoprene, a vinyl resin, an epoxy resin, a urethane resin, a cellulose resin, a siloxane resin, a polyimide resin, a polyamide resin, or a perylene resin. However, embodiments according to the present disclosure are not limited to the above-described examples.

The first insulating layer INS1 may be omitted according to some embodiments or formed as an uppermost layer of the thin film encapsulation layer TFE.

The first conductive layer MT1 may be provided and/or formed on the first insulating layer INS1. The first conductive layer MT1 may form a first layer of a plurality of touch electrodes. The first conductive layer MT1 may have a single-layer structure or a multi-layer structure stacked in a thickness direction of the substrate SUB (for example, the third direction DR3). The first conductive layer MT1 having a single-layer structure may include a metal layer or a transparent conductive layer. For example, the metal layer may include molybdenum, titanium, copper, aluminum, and alloys thereof. The transparent conductive layer may include one of indium tin oxide (ITO), indium zinc oxide (IZO), zinc oxide (ZnO), indium tin zinc oxide (ITZO), PEDOT, and a metal nanowire. However, embodiments according to the present disclosure are not limited to the above-described examples.

The second insulating layer INS2 may be entirely located (or formed) on the first conductive layer MT1 and the first insulating layer INS1. The second insulating layer INS2 may be interposed between the first conductive layer MT1 and the second conductive layer MT2. The second insulating layer INS2 may include the same material as the first insulating layer INS1, or may include one or more materials selected from materials constituting the first insulating layer INS1. However, embodiments according to the present disclosure are not limited to the above-described examples.

The second insulating layer INS2 may be partially opened to include a contact region exposing one area of the first conductive layer MT1.

The second conductive layer MT2 may form a second layer of the plurality of touch electrodes. The second conductive layer MT2 may be located (or formed) on the second insulating layer INS2. The second conductive layer MT2 may include the same material as the first conductive layer MT1, or may include one or more materials selected from materials constituting the first conductive layer MT1. According to some embodiments, the second conductive layer MT2 may be electrically connected to the first conductive layer MT1 through the contact region of the second insulating layer INS2.

According to some embodiments, the second conductive layer MT2 may include a protrusion PP for forming the hole area HA. The protrusion PP may extend from a portion of the second conductive layer MT2. The protrusion PP may be located adjacent to the hole area HA, thus defining the hole area HA.

According to some embodiments, the protrusion PP of the second conductive layer MT2 may not overlap the first conductive layer MT1 in a plan view. The protrusion PP of the second conductive layer MT2 may be sufficiently adjacent to the protrusion PP of the other adjacent second conductive layer MT2 to form the hole area HA. The hole area HA may overlap the light-receiving layer OPL in a plan view. Accordingly, the light reflected by the user's finger F may be provided to the light-receiving layer OPL through the hole area HA.

According to some embodiments, the protrusion PP may overlap the light-receiving layer OPL in a plan view. That is, the light-receiving layer OPL may overlap a portion of the metal pattern, but may not overlap the metal pattern in the hole area HA in a plan view.

Meanwhile, although embodiments in which the second conductive layer MT2 forms the hole area HA is shown, embodiments according to the present disclosure are not limited thereto. For example, the first conductive layer MT1 may include a protrusion to form the hole area HA. However, according to some embodiments, it may be more preferable that the second conductive layer MT2 further spaced apart from the emission layer EML and the light-receiving layer OPL than the first conductive layer MT1 forms the hole area HA. For example, in order to efficiently reflect internal light 1600 (refer to FIG. 11) emitted from the emission layer EML and not emitted to the outside of the display panel DP, and to prevent or reduce instances of the reflected internal light 1600 being directly toward the light-receiving layer OPL, it may be preferable that the conductive pattern reflecting the internal light 1600 is further spaced apart from the emission layer EML (or the light-receiving layer OPL). Accordingly, according to some embodiments, because the second conductive layer MT2 forms the hole area HA, the internal light 1600 emitted from the emission layer EML and not emitted to the outside of the display panel DP may not be directed toward the light-receiving layer OPL more efficiently.

The third insulating layer INS3 may be entirely arranged (or formed) on the second conductive layer MT2 and the second insulating layer INS2. The third insulating layer INS3 may include an organic layer, but embodiments according to the present disclosure are not limited thereto. According to some embodiments, the third insulating layer INS3 may be formed of an inorganic layer or may have a structure in which an organic layer and an inorganic layer are alternately stacked.

Color filters CF1 and CF2 may be located on the touch sensor TS.

The color filters CF1 and CF2 may include a first color filter CF1 positioned on at least one surface of the light blocking pattern LBP of the first sub-pixel SPX1 and the thin film encapsulation layer TFE, and a second color filter CF2 positioned on at least one surface of the light blocking pattern LBP of the first photo-sensing pixel PSR and the thin film encapsulation layer TFE. Hereinafter, the light blocking pattern LBP of the first sub-pixel SPX1 may be referred to as a first light blocking pattern, and the light blocking pattern LBP of the second photo-sensing pixel PSR2 may be referred to as a second light blocking pattern.

The first color filter CF1 may be located within the opening of the first light blocking pattern LBP to directly contact the thin film encapsulation layer TFE exposed by the opening of the first light blocking pattern LBP. The first color filter CF1 may be arranged to overlap the light emitting element LD (or the emission area EMA). For convenience of description, only the first sub-pixel SPX1 is shown in FIG. 7, but the first color filter CF1 may be a blue color filter. According to some embodiments, the first color filter CF1 may further include a green color filter overlapping the emission area EMA of the second sub-pixel SPX2 or a red color filter overlapping the emission area EMA of the third sub-pixel SPX3.

The second color filter CF2 may be located within the opening of the second light blocking pattern LBP to directly contact the thin film encapsulation layer TFE exposed by the opening of the second light blocking pattern LBP. The second color filter CF2 may be arranged to overlap the light-receiving element OPD (or the light-receiving area FXA). The second color filter CF2 may include one of a red color filter, a green color filter, and a blue color filter according to the color of light sensed by the light-receiving layer OPL. For example, when the light-receiving layer OPL absorbs light in a green wavelength band, the second color filter CF2 may be a green color filter. That is, the second color filter CF2 may be set regardless of the color of light emitted by adjacent sub-pixels SPX1, SPX2, and SPX3.

The above-described light blocking pattern LBP and color filters CF1 and CF2 may be used as an anti-reflection layer that blocks reflection of external light. Because the display device DD (or the display panel DP) includes the light blocking pattern LBP and the color filters CF1 and CF2 used as an anti-reflection layer, a separate polarization layer may not be provided. Accordingly, a decrease in luminance may be prevented or reduced and a thickness of the display device DD may be minimized or reduced.

In addition, because the light-receiving element OPD is formed on the same layer as the light emitting element LD, the thickness of the display device DD can be further reduced. In addition, because the amount of external light incident on the light-receiving element OPD is increased, the light sensing performance may be improved. In addition, because the sensor circuit SSC is simultaneously formed in a process of manufacturing the pixel circuit PXC and the light-receiving element OPD is simultaneously formed in a process of manufacturing the light emitting element LD, the process time and manufacturing cost for manufacturing the display device DD can be reduced.

A planarization layer OC may be further located between the first and second color filters CF1 and CF2 and the window WD. The planarization layer OC may be an overcoat layer. The planarization layer OC may serve to planarize steps caused by components located thereunder. The planarization layer OC may be an organic layer. The organic layer may include an acrylic resin, an epoxy resin, a phenolic resin, a polyamide resin, or a polyimide resin, but embodiments according to the present disclosure are not limited thereto.

Figure 11:
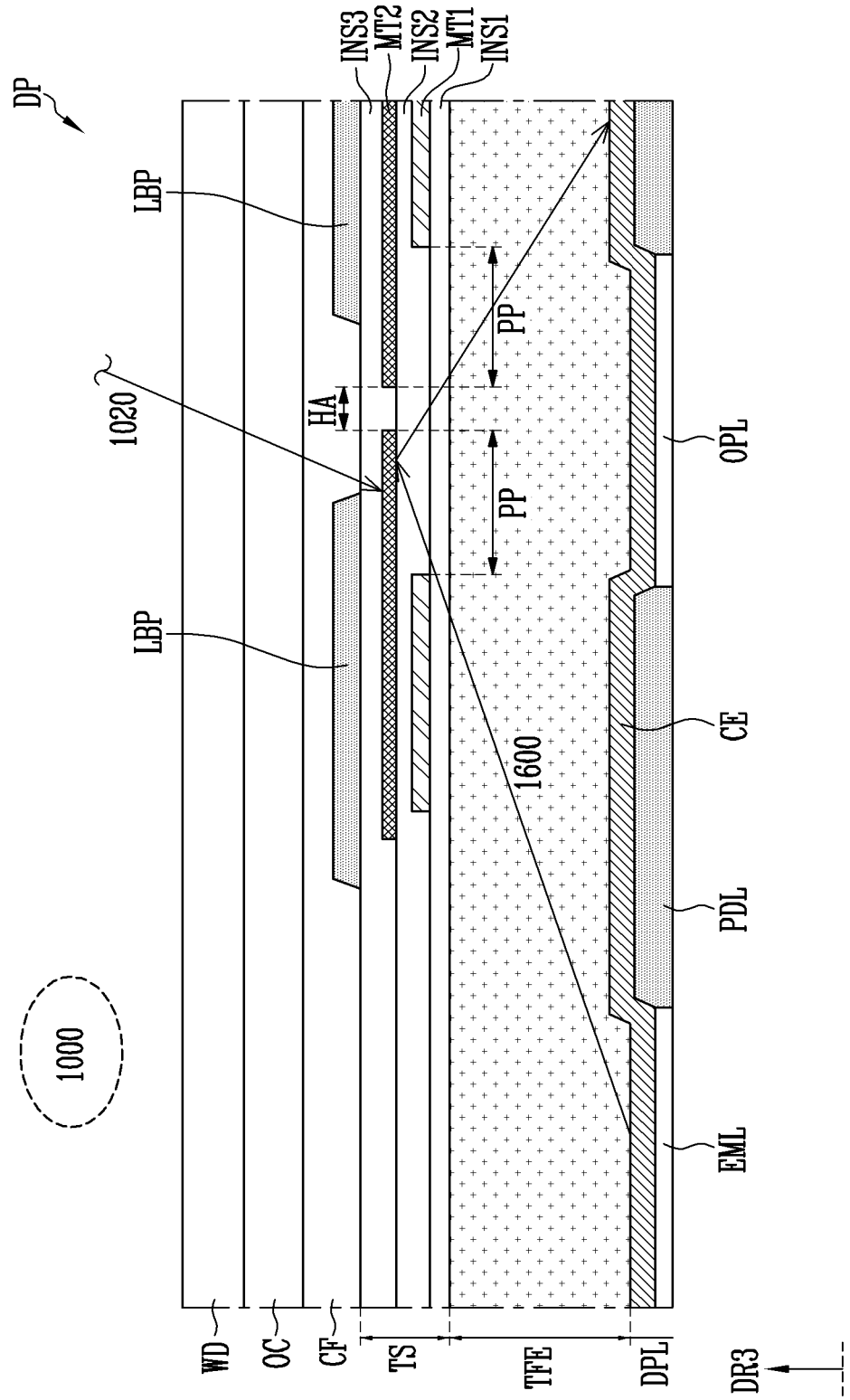
FIG. 11 is a schematic cross-sectional view of the display panel for explaining a technical effect of improving the sensing performance of the photo-sensing pixel according to some embodiments.

Hereinafter, as a technical effect according to the patterned structure of the conductive layer MT according to some embodiments, the improvement of the sensing performance of the photo-sensing pixel PSR will be described with reference to FIG. 11. FIG. 11 is a schematic cross-sectional view of the display panel for explaining a technical effect of improving the sensing performance of the photo-sensing pixel according to some embodiments.

Referring to FIG. 11, the second conductive layer MT2 forming the hole area HA may block external light 1020 provided from outside 1000 (for example, an air layer). In order to sufficiently secure the sensing performance of the photo-sensing pixel PSR, it may be desirable to prevent or reduce the external light 1020 other than the light reflected by the user's finger F from being directed toward the light-receiving layer OPL. For example, the external light 1020 incident on the display panel DP at a lower angle rather than the light reflected by the user's finger F needs to be blocked. Here, the low angle may mean 45 degrees or less with respect to a main surface of the display panel DP. Alternatively, according to some embodiments, the low angle may be greater than or equal to 20 degrees and less than or equal to 25 degrees with respect to the main surface of the display panel DP. However, embodiments according to the present disclosure are not limited thereto.

To this end, in a plan view, a blocking pattern that blocks the external light 1020 in an area overlapping the light-receiving layer OPL may be required. According to some embodiments, because at least one of the conductive layers MT (for example, the second conductive layer MT2) for forming the electrodes of the touch sensor TS has the protrusion PP, the external light 1020 may be blocked more efficiently than the light reflected by the user's finger F. In this case, in order to block the external light 1020 more efficiently than the light reflected by the user's finger F, the size of the hole area HA needs to be less than or equal to a predetermined size (for example, less than or equal to 7.5 μm). According to some embodiments, because the conductive layer MT may be patterned by a wet etching method, the conductive layers MT may be formed to be spaced apart from each other by a predetermined distance or less.

For example, according to some embodiments, because a structure for improving the sensing performance of the photo-sensing pixel PSR can be formed using a portion of the conductive layer MT for forming the touch sensor TS, an additional process may not be required, and consequently the manufacturing cost may be reduced.

According to some embodiments, the second conductive layer MT2 forming the hole area HA may not reflect the internal light 1600 emitted from the emission layer EML toward the light-receiving layer OPL. For example, the second conductive layer MT2 forming the hole area HA may reflect and guide the internal light 1600 so that the internal light 1600 is directed toward the pixel defining layer PDL. For example, the internal light 1600 emitted from the emission layer EML and not emitted to the outside of the display panel DP may be reflected by the protrusion PP of the second conductive layer MT2 and may not be directed toward the light-receiving layer OPL. In this case, the protrusion PP of the second conductive layer MT may allow the internal light 1600 to be directed toward the pixel defining layer PDL rather than the light-receiving layer OPL. Accordingly, the amount of the light that does not reach the user's finger F is absorbed into to the light-receiving layer OPL can be minimized.

According to the embodiments of the disclosure, the display device capable of clearly sensing an external input may be provided by improving the sensing performance of a photo-sensing pixel.

As described above, the aspects of some embodiments of the disclosure have been disclosed through the detailed description and the drawings. However, those skilled in the art or those of ordinary skill in the art will appreciate that various modifications and changes are possible without departing from the features and technical scope of the disclosure as set forth in the claims below.

Therefore, the technical protection scope of embodiments according to the present disclosure are not limited to the detailed description described in the specification, but should be determined by the appended claims, and their equivalents.

What is claimed is:

1. A display device comprising:
a sub-pixel on a substrate and including a light emitting element;
a photo-sensing pixel on the substrate and including a light-receiving element including a light-receiving layer configured to obtain a sensing signal corresponding to light emitted from the light emitting element;
a touch sensor configured to obtain information about a touch input and including a conductive layer,
wherein the conductive layer includes a hole area overlapping the light-receiving layer in a plan view,
wherein the conductive layer includes a protrusion adjacent to the hole area to define the hole area,
wherein the conductive layer includes a first conductive layer and a second conductive layer, and
wherein the protrusion extends from a portion of the second conductive layer, and overlaps the light-receiving layer without overlapping the first conductive layer in the plan view.

2. The display device of claim 1, wherein the sub-pixel includes an emission area from which the light is emitted from the light emitting element, and
wherein the photo-sensing pixel includes a light-receiving area configured to receive the light.

3. The display device of claim 2, wherein a portion of the conductive layer surrounds the emission area, and another portion of the conductive layer surrounds the light-receiving area.

4. The display device of claim 2, wherein the conductive layer surrounds a portion of the light-receiving area in the hole area in the plan view.

5. The display device of claim 2, wherein the conductive layer includes a first area and a second area,
wherein the first area of the conductive layer is adjacent to the hole area and surrounds at least a portion of the hole area, and
wherein the second area of the conductive layer is spaced apart from the hole area.

6. The display device of claim 5, wherein the first area of the conductive layer has a first width and the second area of the conductive layer has a second width, and
wherein the first width is greater than the second width.

7. The display device of claim 5, wherein the conductive layer further includes a third area,
wherein the third area of the conductive layer is an area connecting adjacent second areas, and
wherein the third area has a polygonal shape forming an opening area.

8. The display device of claim 5, wherein the conductive layer further includes a third area,
wherein the third area of the conductive layer is an area connecting adjacent second areas, and
wherein the third area has a shape in which the adjacent second areas intersect each other without forming an opening area.

9. The display device of claim 2, wherein the hole area has a rectangular shape in the plan view.

10. The display device of claim 2, wherein the conductive layer is spaced apart from the emission area by a separation distance, and
wherein a diameter of the hole area is smaller than the separation distance.

11. The display device of claim 10, wherein the separation distance is 8.0 µm or more and 15 µm or less.

12. The display device of claim 2, wherein the sub-pixel includes a first sub-pixel configured to emit light of a first color, a second sub-pixel configured to emit light of a second color, and a third sub-pixel configured to emit light of a third color, and
wherein the light-receiving area is adjacent to an emission area of the first sub-pixel and an emission area of the third sub-pixel in a first direction, and is adjacent to an emission area of the second sub-pixel in a second direction different from the first direction.

13. The display device of claim 1, wherein the second conductive layer is more spaced apart from the substrate than the first conductive layer.

14. The display device of claim 1, wherein a diameter of the hole area is 7.5 µm or less.

15. The display device of claim 1, wherein the conductive layer is patterned by a wet etching process.

16. The display device of claim 1, wherein the light-receiving element includes at leasts one of a photo diode, a CMOS image sensor, a CCD camera, or a photo transistor.

17. The display device of claim 1, wherein the conductive layer forms a driving electrode and a receiving electrode of the touch sensor.

18. An electronic device comprising the display device of claim 1.

* * * * *